United States Patent
Ozeki

(10) Patent No.: US 8,141,146 B2
(45) Date of Patent: Mar. 20, 2012

(54) AUTHENTICATION SERVER, AUTHENTICATION METHOD AND AUTHENTICATION PROGRAM

(75) Inventor: Hiroaki Ozeki, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 634 days.

(21) Appl. No.: 12/354,637

(22) Filed: Jan. 15, 2009

(65) Prior Publication Data

US 2009/0187986 A1    Jul. 23, 2009

(30) Foreign Application Priority Data

Jan. 23, 2008 (JP) ................... 2008-13166

(51) Int. Cl.
*G06F 7/04* (2006.01)
(52) U.S. Cl. ............... 726/21; 726/19; 726/22; 382/181
(58) Field of Classification Search .................. 713/182, 713/202; 726/19, 21, 22; 382/181
See application file for complete search history.

(56) References Cited

U.S. PATENT DOCUMENTS

| | | | | |
|---|---|---|---|---|
| 2008/0052245 | A1* | 2/2008 | Love | 705/76 |
| 2008/0216163 | A1* | 9/2008 | Pratte et al. | 726/7 |
| 2010/0034432 | A1* | 2/2010 | Ono et al. | 382/118 |
| 2011/0166916 | A1* | 7/2011 | Inbar | 705/14.4 |

FOREIGN PATENT DOCUMENTS

JP    2005-322214    11/2005

OTHER PUBLICATIONS

László Zsidi "animated_captcha"<URL http://www.phpclasses.org/browse/package/3423.html> accessed on Jan. 22, 2008.

* cited by examiner

*Primary Examiner* — Kim Vu
*Assistant Examiner* — Suman Debnath
(74) *Attorney, Agent, or Firm* — Shimokaji & Assoc., P.C.

(57) ABSTRACT

Upon receipt of a service use request from a client, an authentication server device reads one or more image information pieces from an image information storage storing multiple image information pieces each containing one or more known symbols, one or more dummy symbols, or both of them, and thereafter creates challenge data using the one or more read image information pieces so that one or more two-dimensional images each containing one or more of the known symbols and one or more two-dimensional images each containing one or more of the dummy symbols can be presented to the user of the client, one image at a time. Upon receipt of response data, the authentication server device judges whether or not the received response data matches the one or more known symbols contained in the challenge data, and approves the service use of the client device if the match is confirmed.

16 Claims, 15 Drawing Sheets (a)          (b)

(a)

(b)

(c)

(d)

(a)

(b)

(a)            (b)

AUTHENTICATION SERVER, AUTHENTICATION METHOD AND AUTHENTICATION PROGRAM

BACKGROUND OF THE INVENTION

The present invention relates to a completely automated public Turing test to tell computers and humans apart (CAPTCHA), and more particularly to an authentication technique using a CAPTCHA technique which can increase the attack resistance quantitatively while maintaining a certain level of readability.

CAPTCHA is a technique used for preventing robots from using various services provided by computers. It is known to use a CAPTCHA technique for simple authentication for preventing spam comments on blogs or for preventing robots from automatically obtaining a free e-mail account.

Various CAPTCHAs such as a CAPTCHA using audio data and a CAPTCHA using photo image data have been studied. However, in view of the ease of creating questions for tests and the use of environment constraints, a CAPTCHA using text images is sometimes commonly employed. In a CAPTCHA using text images, characters which are distorted or partly obscured are presented to the user. Then, if the correct characters are inputted by the user, the user is assumed to be human.

However, recently, with the improvement in the accuracy of an optical character reader (OCR) technique, attacks by spammers have been succeeding in breaking such a CAPTCHA technique using two-dimensional text images. Although means for complexly varying the background of a two-dimensional text image can be used as a countermeasure, the use of such means may make it difficult also for humans to read the characters.

Japanese Patent Application Publication No. 2005-322214 discloses techniques of providing text images that allow humans to easily read characters thereon while making it difficult for computers to read the characters. A technique disclosed in Japanese Patent Application Publication No. 2005-322214 is to partially mitigate the probability of creating unsolvable or impossible questions (challenges), by reducing the randomness with which arcs and/or clutter are arranged about or combined with a HIP sequence by more evenly dispersing arcs and/or clutter across the text.

One technique uses a dummy character effective in scattering attacks over an image for a challenge as disclosed in Japanese Patent Application Publication No. 2005-322214. The technique uses an arc with a width close to or larger than the average width of a character font. In this technique, an image having characters placed therein, arcs may be evenly arranged without overlapping the characters.

Another technique for making it difficult for computers to read characters is to present authentication data in the form of animation as shown, for example, in László Zsidi "animated_captcha"<URL http://www.phpclasses.org/browse/package/3423.html> accessed on Jan. 22, 2008 (hereinafter "Zsidi"). In this technique, authentication data analysis may be made difficult for robots by prohibiting an entire text for authentication from appearing in each of the frames of two-dimensional images forming animation. In other words, the technique may prohibit all the characters in a character string for authentication from appearing together in a single frame.

However, even with the above-described conventional techniques, it may be difficult to increase the attack resistance quantitatively while maintaining a certain level of readability, in response to use situations and technical advance. In the above techniques of Japanese Patent Application Publication No. 2005-322214, a HIP sequence presented to the user is a single two-dimensional image. Accordingly, when the number of arcs and/or clutters is increased to make it difficult for computers to read characters, the amount of overlap between characters and arcs and/or clutters increases, and thus the readability is reduced. Moreover, when the number of arcs serving as dummy characters is increased, the two-dimensional image results in being larger in size since such arcs need to be arranged away from the characters. Hence, the readability is reduced all the same.

SUMMARY OF THE INVENTION

In one aspect, an exemplary embodiment of the invention comprises an authentication server device including an image information storage which stores therein a plurality of image information pieces each containing at least one of one or more known symbols and one or more dummy symbols; a receiver which receives a service use request from a client device via a network; a reading unit which reads one or more of the image information pieces from the image information storage in response to receipt of the service use request; a challenge data creation unit which creates challenge data by using the one or more read image information pieces so that one or more two-dimensional images each containing one or more of the known symbols and one or more two-dimensional images each containing one or more of the dummy symbols are presented in turn to the user of the client device, one image at a time; a testing unit which transmits the created challenge data to the client device, and which receives corresponding response data from the client device; and approving means which judges whether or not the received response data matches the one or more known symbols contained in the transmitted challenge data, and which approves the service use of the client device if the match is confirmed.

In another aspect, an exemplary embodiment of the invention comprises an authentication method performed by an authentication server including an image information storage storing therein a plurality of image information pieces each containing at least one of one or more known symbols and one or more dummy symbols, the authentication method including steps of receiving a service use request from a client device via a network; reading one or more of the image information pieces from the image information storage in response to receipt of the service use request; creating challenge data by using the one or more read image information pieces so that one or more two-dimensional images each including one or more of the known symbols and one or more two-dimensional images each including one or more of the dummy symbols are presented in turn to the user of the client device, one image at a time; transmitting the created challenge data to the client device, and receiving corresponding response data from the client device; and judging whether or not the received response data matches one or more of the known symbols contained in the transmitted challenge data, and approving the service use of the client device if the match is confirmed.

In a further aspect, an exemplary embodiment of the invention may comprise an authentication program executed by an authentication server including an image information storage storing therein a plurality of image information pieces each containing one or more known symbols, one or more dummy symbols, or both one or more known symbols and one or more dummy symbols, the authentication program causing the authentication server to execute the steps including receiving a service use request from a client device via a network;

reading one or more of the image information pieces from the image information storage in response to receipt of the service use request; creating challenge data using the one or more read image information pieces so that one or more two-dimensional images each including one or more of the known symbols and one or more two-dimensional images each including one or more of the dummy symbols are presented in turn to the user of the client device, one image at a time, the challenge data being for testing whether or not the user of the client device is human; transmitting the created challenge data to the client device, and receiving corresponding response data from the client device; and judging whether or not the received response data matches one or more of the known symbols contained in the transmitted challenge data, and approving the service use of the client device if the match is confirmed.

These and other features, aspects and advantages of this invention will become better understood with reference to the following drawings, description, and claims.

DETAILED DESCRIPTION OF THE PREFERRED EMBODIMENTS

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

According to one exemplary embodiment of the present invention, the user of the client device may be provided with one or more two-dimensional images each containing one or more known symbols and one or more two-dimensional images each containing one or more dummy symbols, one image at a time, as challenge data for testing whether or not the user of the client device is human. The user provided with the challenge data may be required to return, as an answer, the one or more known symbols contained in the provided two-dimensional images.

Humans have a perception characteristic likely to perceive or find known symbols more easily than unknown symbols having no particular meaning. Accordingly, humans provided with a CAPTCHA technique according to the present invention can quickly select two-dimensional images containing known symbols and can easily distinguish known symbols as correct answers among multiple two-dimensional images provided one image at a time. Accordingly, readability may not be affected even when the number of two-dimensional images to be provided increases.

By contrast, it may be difficult for computers not having such a perception characteristic to distinguish known symbols to be the correct answers from dummy symbols. Consequently, computers may need to analyze each of the provided two-dimensional images equally. Accordingly, it may become more difficult for computers to analyze a CAPTCHA technique according to the present invention as the number of two-dimensional images to be provided increases.

Figure 1:
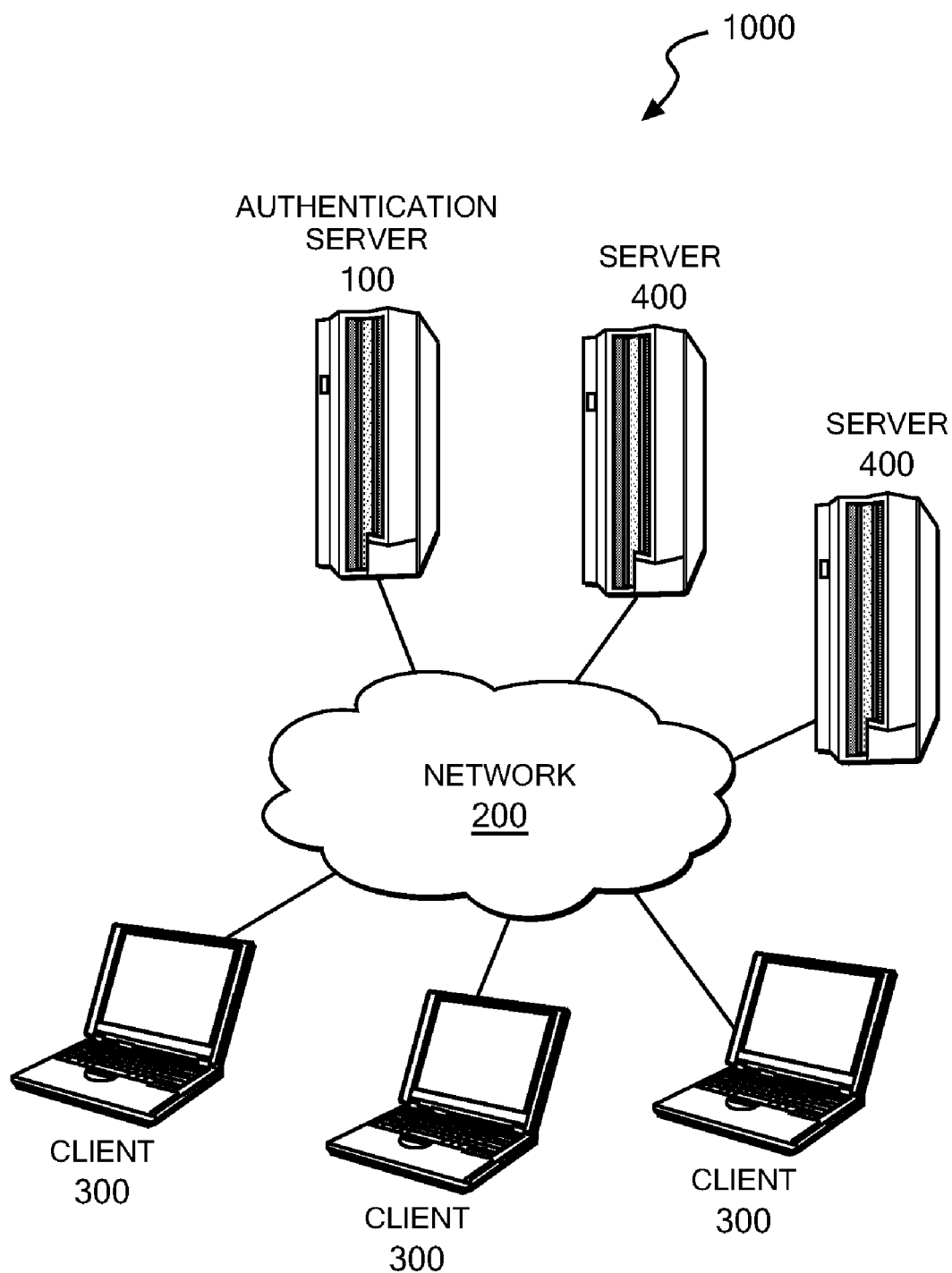
FIG. 1 is a view showing an example of the entire configuration of an authentication system according to a first embodiment of the present invention.

First, an authentication system according to one exemplary embodiment of the invention will be described with reference to FIG. 1. FIG. 1 is a view showing an example of the entire configuration of an authentication system 1000 according to a first exemplary embodiment of the present invention. The authentication system 1000 includes: multiple servers 400 such as web servers; multiple client devices 300; and an authentication server 100. The server 400 may be connected to a network 200 such as the Internet or LAN (local area network), and provides various services to the client 300. The client 300 may be connected to the network 200, and requests, to the server 400, provision of a service. The authentication server 100 may be connected to the network 200, and provides the multiple servers 400 and the multiple clients 300 with authentication services. Communications between the devices may be performed by using any suitable protocol, for example, TCP (Transmission Control Protocol) or HTTP (HyperText Transfer Protocol).

To request provision of a service to the server 400, the client 300 may access the authentication server 100 first. When receiving a service request from the client 300, the authentication server 100 authenticates whether or not the client 300 may be eligible for the service, in other words, whether or not a user of the client 300 is human, using a challenge-response type test. The authentication server 100 according to the present invention presents, to the user, as challenge data, one or more two-dimensional images each containing one or more known symbols, and one or more two-dimensional images each containing one or more dummy symbols, in a manner that one image may be displayed on a screen of the client 300 at a time.

Upon receipt of the challenge data, the user of the client 300 may read the known symbol in the presented multiple two-dimensional images and then may input the symbol to the client 300. The client 300 may transmit the inputted data as response data to the authentication server 100. The authentication server 100 may determine whether or not the received response data matches the one or more known symbols contained in the challenge data. When the authentication is successful, the authentication server 100 may transmit approval information to the client 300. Upon receipt of the approval information, the client 300 may transmit the approval information to the server 400 asking for the approval information and may thereby be provided with the service by the server 400.

By contrast, when the authentication is unsuccessful, the authentication server 100 may reject the request to allow the client 300 to use the service of the server 400. Note that, although FIG. 1 shows a case in which the authentication server 100 provides authentication services to the multiple servers 400, another configuration may also be employed such that the authentication server 100 can be provided for each of the servers 400. Alternatively, the authentication server 100 and the server 400 may also be implemented as a single server. Moreover, still another configuration may also be employed such that the client 300 may request provision of a service directly to the server 400, and such that the authentication server 100 may receive the service request from the client 300 through the server 400.

Figure 2:
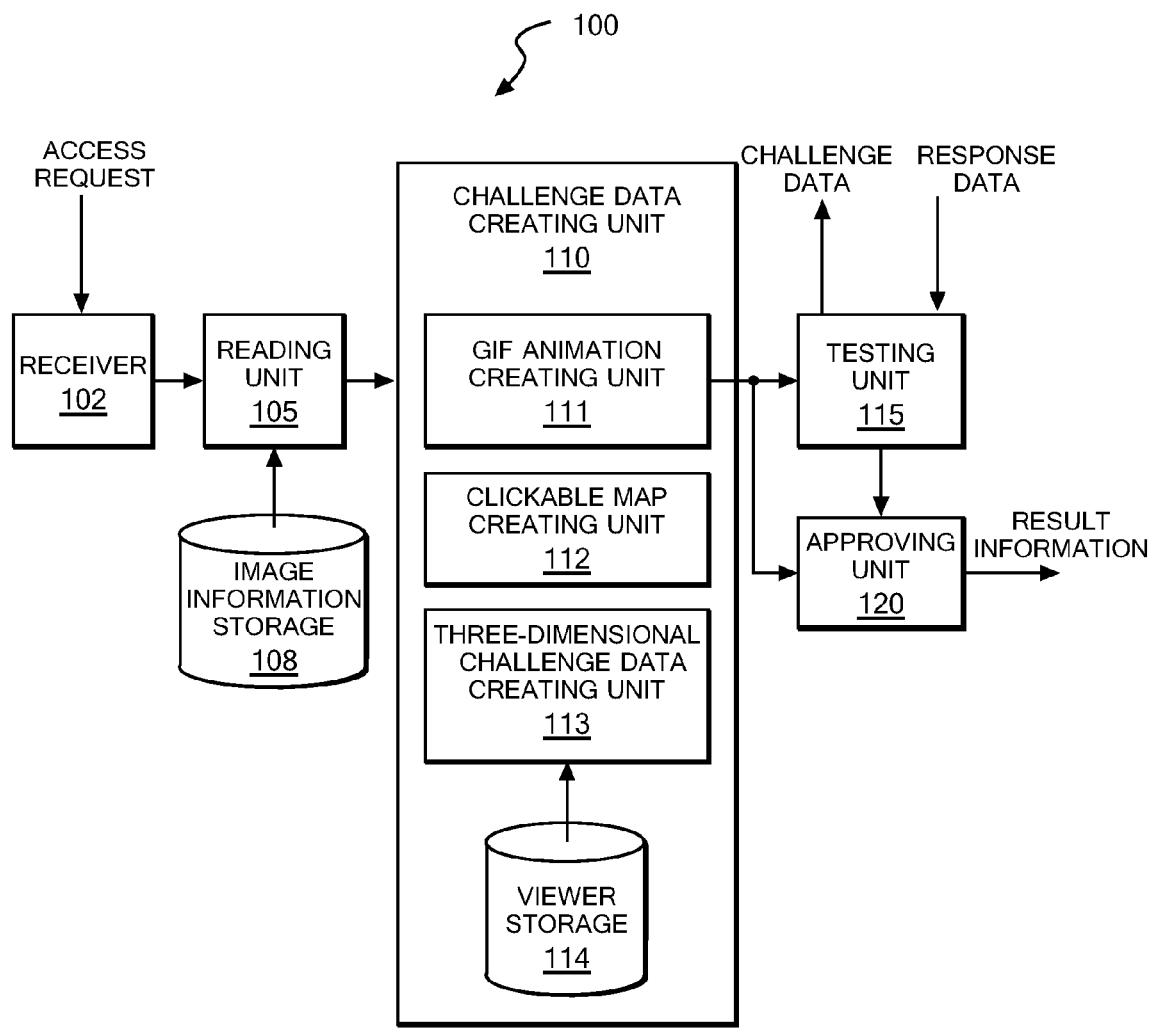
FIG. 2 is a diagram showing an example of a functional configuration of an authentication server according to a first exemplary embodiment of the present invention.

FIG. 2 is a diagram showing an example of a functional configuration of the authentication server 100 according to the first exemplary embodiment of the present invention. The authentication server 100 according to the first exemplary embodiment of the present invention may include: a receiver 102; a reading unit 105; an image information storage 108; a challenge data creating unit 110; testing means 115; and approving means 120.

The receiver 102 may receive, from each of the clients 300, a request to allow the client 300 to use a service provided by any one of the servers 400, through the network 200. The services provided by the servers 400 can be services of any form, for example, a service of providing a free e-mail account, a service of posting comments to a blog or an electronic bulletin board, a service of downloading various kinds of information such as documents, and a service of making a reservation for a seat at a restaurant or a cinema.

The image information storage 108 may store therein multiple image information pieces each containing at least one known symbol and/or at least one dummy symbol. Here, the known symbol can be any symbol such as a character, a numeral and a sign including the plus sign, as long as it is known. Nevertheless, it may be preferable to choose a symbol, such as an alphanumeric, which may be easy to input, since the known symbol may be that which the user needs to input to the client 300 as the correct answer. Moreover, in order to avoid the same data for authentication from being reused, it may be preferable to choose a symbol having a variety of forms.

A dummy symbol, on the other hand, may be a symbol which humans can easily distinguish from a correct known symbol, and which computers may be likely to mistakenly judge as the correct known symbol. Preferably, the dummy symbol may be a symbol which may be similar to the known symbol in shape or line width or in both, and which does not have a particular recognizable meaning.

The image information storage 108 according to the first exemplary embodiment of the present invention may store therein multiple two-dimensional images each containing one or more known symbols and multiple two-dimensional images each containing one or more dummy symbols. The two-dimensional images each containing one or more known symbols may further contain one or more dummy symbols. The image information storage 108 may store therein the two-dimensional images each containing one or more known symbols by associating each of the images with the one or more known symbols contained in the image. As an example, each of the two-dimensional images may be described as an n×m matrix (where n and m are each a predetermined constant), and the data forming the matrix may be described by four elements (R, G, B and α) called texels. Here, R, G and B respectively may represent red color information, green color information and blue color information on texels, and α may indicate transparency of the image when the image is superimposed on another image.

Each of the two-dimensional images may include an arc in the background or the foreground, or in both. As described above, the arc may be information which humans can easily distinguish from a correct known symbol and which computers are likely to mistakenly judge as part of a correct known symbol or the whole of a correct known symbol. For example, an arc may be a line or a curved line. Alternatively, an arc may be a background having a similar color to that of the known symbol or a background having a certain shape. Moreover, as a conventional two-dimensional CAPTCHA, each of the two-dimensional images may contain distorted or blurred known symbols and dummy symbols.

The reading unit 105 may randomly read one or more image information pieces from the image information storage 108 in response to reception of a service use request from the client 300. More specifically, in response to reception of the service use request, the reading unit 105 according to the first exemplary embodiment of the present invention may read one or more two-dimensional images each containing one or more known symbols and one or more two-dimensional images each containing one or more dummy symbols from the image information storage 108 according to the above-mentioned first embodiment. Then, the reading unit 105 may pass the one or more read image information pieces to the challenge data creating unit 110. Moreover, the reading unit 105 may pass the one or more known symbols contained in the one or more read image information pieces to the approving means 120 to be described later. It should be noted that, in light of security, it may be preferable that the reading unit 105 store the history of the one or more read image information pieces or discard the one or more read image information pieces so as to avoid the same data for authentication from being reused.

The challenge data creating unit 110 may create challenge data for testing whether or not the user of the client 300 is human by using the one or more read image information pieces. The challenge data may be used to present to the user of the client 300, the one or more two-dimensional images each containing one or more known symbols and the one or more two-dimensional images each containing one or more dummy symbols, one image at a time.

More specifically, the challenge data creating unit 110, according to the first exemplary embodiment of the present invention, may include a GIF animation creating unit 111. The GIF animation creating unit 111 may create, as challenge data, an animation in the animation GIF format, the animation using the multiple two-dimensional images received from the reading unit 105 according to the first embodiment of the present invention. Here, a GIF animation may be an animation created by storing multiple GIF images in a single file and then sequentially displaying the GIF images. The GIF animation creating unit 111 may randomly arrange the multiple two-dimensional images received from the reading unit 105, and may then store the two-dimensional images in a single file, and thereby create an animation in the animation GIF format.

Alternatively, the challenge data creating unit 110, according to the first exemplary embodiment of the present invention, may also create a document in which hyperlinks of the multiple two-dimensional images received from the reading unit 105 according to the first exemplary embodiment of the present invention are embedded. In any of the above cases, the challenge data creating unit 110 may pass the created challenge data to the testing means 115.

The testing means 115 may transmit the challenge data received from the challenge data creating unit 110 to the client 300 which requested to use the service and then receive corresponding response data from the client 300. Thereafter, the testing means 115 may pass the received response data to the approving means 120.

The approving means 120 may determine whether or not the response data received from the testing means 11 5 matches the one or more known symbols contained in the challenge data transmitted by the testing means 115. When the response data is determined to match the one or more known symbols, the approving means 120 may approve the service use of the client 300. In a case where multiple known symbols are contained in the challenge data, the approving means 120 may also approve the service use of the client 300 under the condition that equal to or more than a certain matching ratio is achieved, even though the received response data does not match the multiple known symbols completely.

Alternatively, even in a case where the received response data does not match the one or more known symbols (or called first symbols), the approving means 120 may also give the client 300 a few chances to try a test, instead of immediately disapproving the service use. Specifically, the approving means 120 may determine, for each challenge data piece, whether or not the received response data matches the one or more known symbols contained in the transmitted challenge data, and may approve the service use of the client 300 if the number of cases in which the received data matches the one or more known symbols exceeds a predetermined number.

When approving the service use, the approving means 120 may create approval information, and then may transmit the approval information to the client 300. The client 300 may present the received approval information to the relevant server 400 and thereby uses the requested service. In the case of receiving the service use request through the server 400, the approving means 120 may transmit the approval information directly to the server 400. Meanwhile, when disapproving the service use, the approving means 120 may reject for a certain time period, an access request, for example, from a client 300 having the same IP address or the same identification number such as a MAC address, as that of the relevant client 300.

The image information stored in the image information storage 108, according to the first exemplary embodiment of the present invention described above, may be two-dimensional image information. Next, a case in which the image information stored in the image information storage 108 may be three-dimensional image information will be described. Note that, even in the case where the image information stored in the image information storage 108 is three-dimensional image information, there is no functional difference in the receiver 102, the testing means 115 and the approving means 120. Thus, description will be given only of the image information storage 108, the reading unit 105 and the challenge data creating unit 110 below.

The image information storage 108 according to a second exemplary embodiment of the present invention may store therein multiple three-dimensional image information pieces on a three-dimensional object on a surface of which one or more known symbols and one or more dummy symbols can be seen, by associating the three-dimensional image information pieces with the one or more known symbols. Here, the three-dimensional image information may contain at least shape information on the three-dimensional object and color information on the surface of the three-dimensional object.

Figure 3:
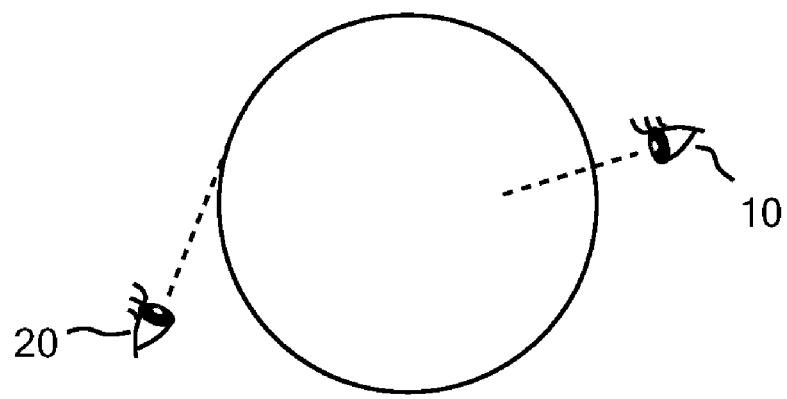
FIG. 3A is a view showing an example of a three-dimensional object created by a three-dimensional data creating device according to a second exemplary embodiment of the present invention.
FIG. 3B is another view showing the example of the three-dimensional object created by the three-dimensional data creating device according to the second exemplary embodiment of the present invention.
FIG. 3C is still another view showing the example of the three-dimensional object created by the three-dimensional data creating device according to the second exemplary embodiment of the present invention.
Figure 3:
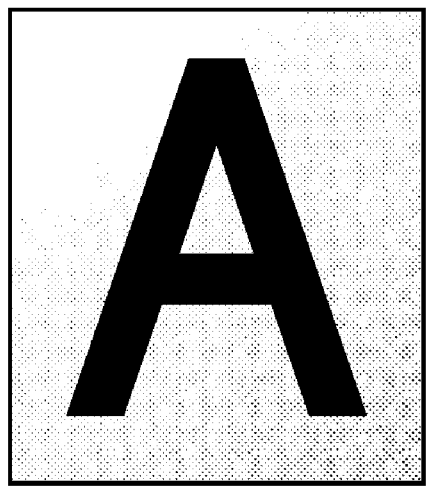
Figure 3:
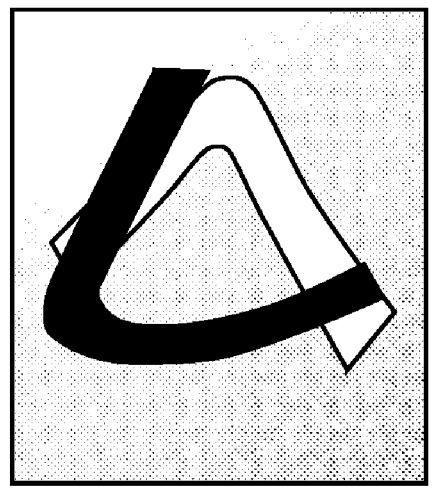

FIGS. 3A to 3C show an example three-dimensional object. In the example shown in FIG. 3A, the shape of the three-dimensional object is spherical. When the three-dimensional object is seen from a viewpoint 10, a known symbol that is a correct answer (a letter A as shown in FIG. 3B) can be seen on the surface. By contrast, when the three-dimensional object is seen from a viewpoint 20, a second symbol that is a dummy (two symbols each having a shape similar to that of the letter A as illustrated in FIG. 3C) can be seen on the surface.

In a case of using such a three-dimensional object for challenge data, the user may be required to observe the three-dimensional object from multiple viewpoints to find the correct known symbol and to then give the answer thus found. When a three-dimensional object is shown to the user on a computer screen, the user sees a two-dimensional image of the three-dimensional object seen from a viewpoint. Thus, to use, as challenge data, a three-dimensional object on a surface of which one or more known symbols and/or one or more dummy symbols can be seen, may be the same as to present, as challenge data to the user of a client device, one or more two-dimensional images each containing one or more known symbols and one or more two-dimensional images each containing one or more dummy symbols, one image at a time.

Figure 4:
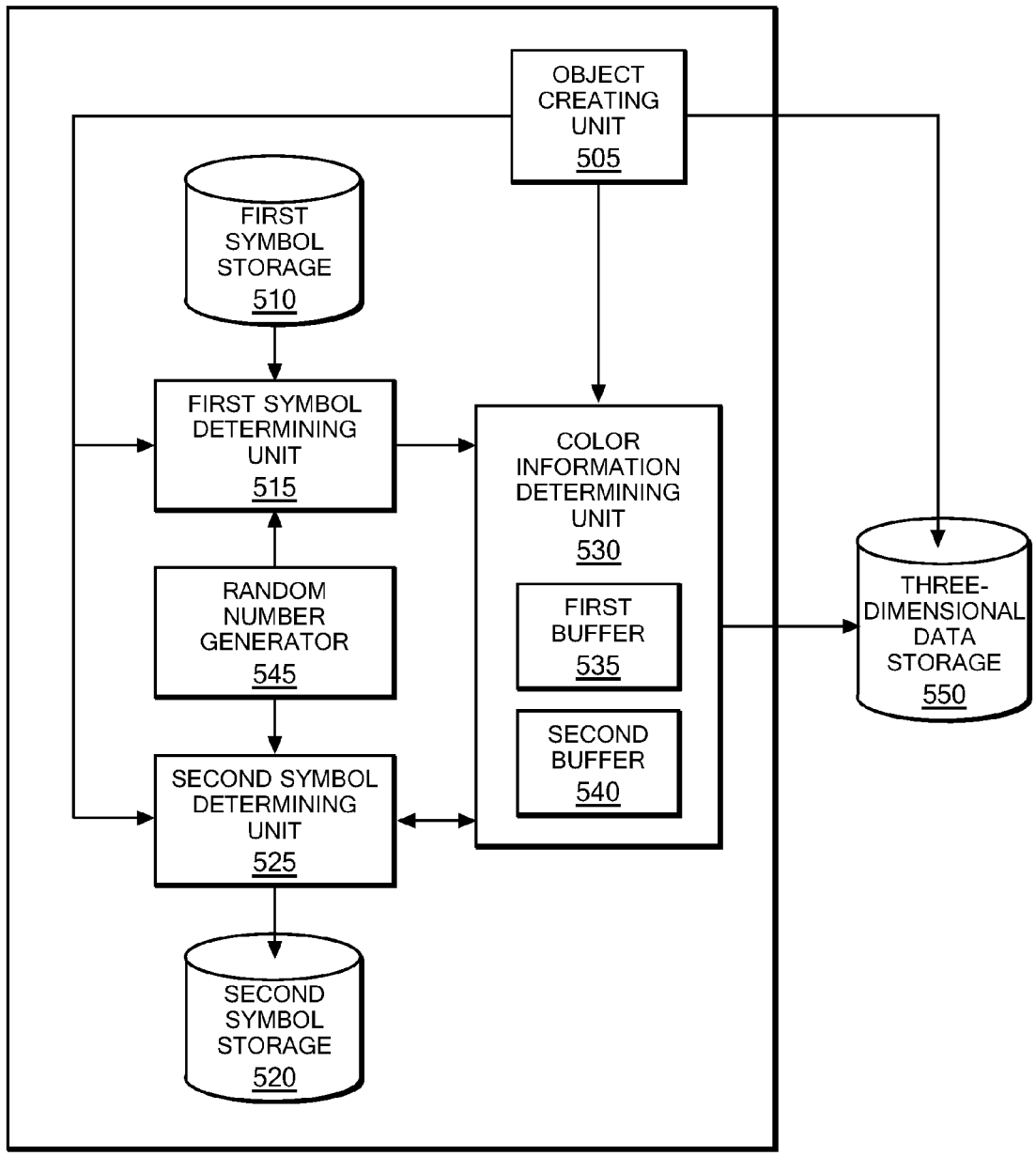
FIG. 4 is a diagram showing an example of a functional configuration of the three-dimensional data creating device according to the second exemplary embodiment of the present invention.

A method of creating three-dimensional image information on such an exemplary three-dimensional object will be described with reference to FIGS. 4 to 6, FIGS. 7A and 7B, FIGS. 8A to 8D, and FIGS. 9A and 9B. FIG. 4 is a diagram showing an example of a functional configuration of a three-dimensional data creating device 500. The three-dimensional data creating device 500 according to the second exemplary embodiment of the present invention may include: an object creating unit 505; a first symbol storage 510; a first symbol determining unit 515; a second symbol storage 520; a second symbol determining unit 525; a color information determining unit 530; a three-dimensional data storage 550; and a random number generator 545.

The object creating unit 505 may create a three-dimensional object in a three-dimensional virtual space, and then may store shape information on the created three-dimensional object in the three-dimensional data storage 550. The three-dimensional object to be created may have any shape. In addition, the three-dimensional object may be formed of a set of polygons using a general modeling method. In this case, the shape information on the three-dimensional object to be stored in the three-dimensional data storage 550 may contain at least index numbers indicating the names of polygons and the coordinates of the vertices of each polygon. The object creating unit 505 may select a sphere as the shape of the three-dimensional object and create the three-dimensional object formed by distributing small spheres in the spherical space. In this case, the shape information on the three-dimensional object to be stored in the three-dimensional data storage 550 may contain at least the coordinates of the center point of the spherical space (which may also be set as the origin) and the radius R of the spherical space, as well as the radius r of the small sphere and the coordinates of the center point of the small sphere or the distribution expression.

As described above, in the CAPTCHA according to the present invention, a two-dimensional image containing a dummy symbol may be added to a two-dimensional image presented as challenge data to increase the number of two-dimensional images for computers to analyze. Thereby, the CAPTCHA according to the present invention may be made difficult to analyze. Accordingly, it is possible to make it difficult for computers to read the symbol to be the correct answer by placing dummy symbols on the three-dimensional object from different directions and thereby requiring computers to analyze the dummy symbols from different directions. Hence, an increase in variation in the appearance of the three-dimensional object depending on the viewpoint may lead to an increase in the number of directions from which computers need to analyze the three-dimensional object. This means that it may be difficult for computers to read the correct symbol.

Figure 5:
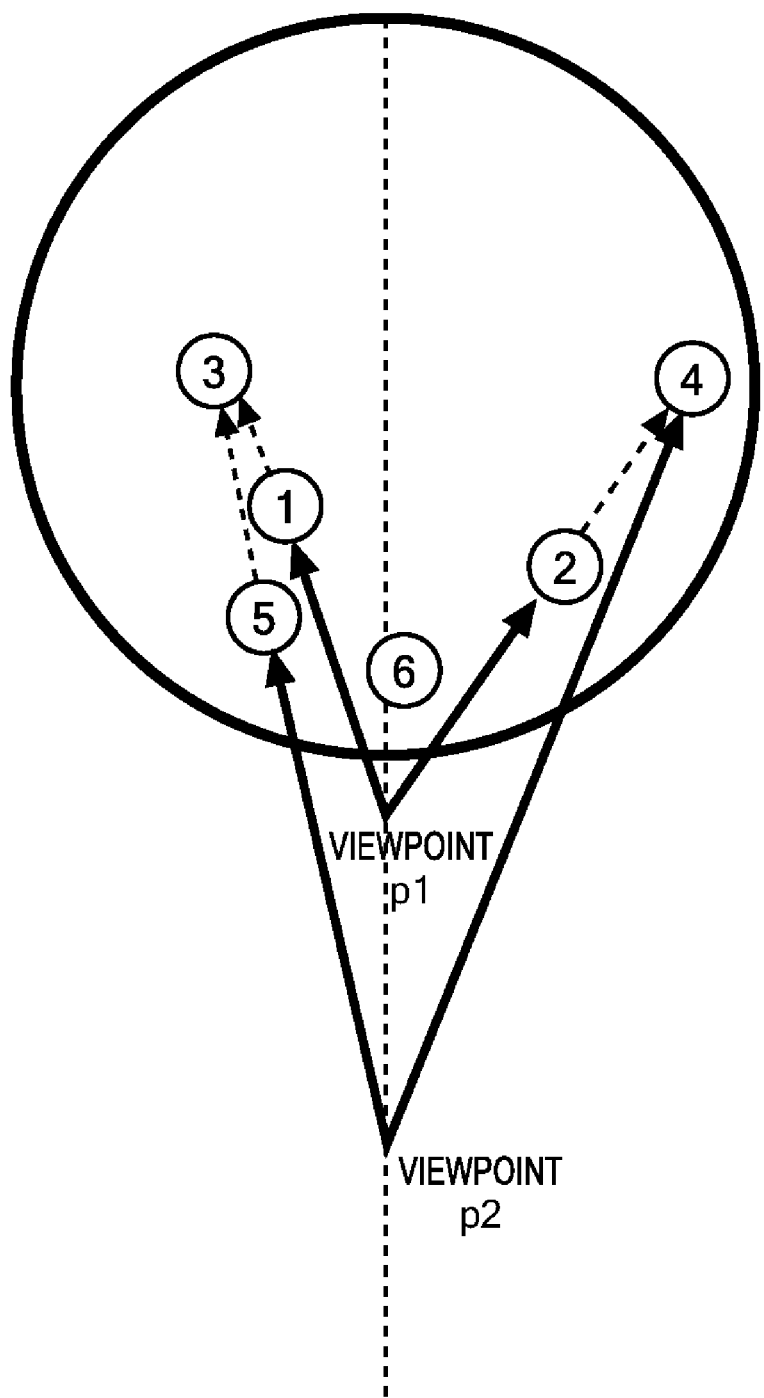
FIG. 5 is a view showing an example of the three-dimensional object created by the three-dimensional data creating device according to the second exemplary embodiment of the present invention.

In light of the above circumstances, in the second exemplary embodiment, in order to make the appearance of the surface of the three-dimensional object vary depending on the viewpoint, a spherical shape may be chosen as the shape of the three-dimensional object. Further, the three-dimensional object being spherical in shape may be formed of a set of multiple small spheres. With reference to FIG. 5, description will be given to explain that, in a case of forming the sphere of a set of multiple small spheres, the image that can be seen on the surface of the sphere may vary a lot depending on not only a direction from which the sphere is seen but also a distance between the sphere and the viewpoint.

FIG. 5 is a cross-sectional view of a three-dimensional object taken along a horizontal line, the three-dimensional object being formed of small spheres distributed in the spherical space. For ease of illustration, only some of the small spheres are shown in FIG. 5. As may be understood from FIG. 5, when the three-dimensional object is seen from a viewpoint P1, which is close to the three-dimensional object, small spheres 1 and 2 are seen in the front while small spheres 3 and 4 are hidden behind the spheres 1 and 2 and hence cannot be seen. Meanwhile, when the three-dimensional object is seen from a viewpoint P2, which is further from the three-dimensional object, the small sphere 4 and a small sphere 5 are seen in the front while the small sphere 3 is hidden behind the small sphere 5 and hence cannot be seen. As described above, in the case of forming the sphere of a set of multiple small spheres, the small spheres that can be seen vary depending on the distance between the sphere and the viewpoint, and consequently, the appearance of the symbols drawn on the surface of the sphere also varies.

Note that, the most ideal distribution and density of small spheres in the spherical space may be those creating a state in which the same number of small spheres can be seen in the same density from any directions the spherical space is seen. Nevertheless, there should not be a problem even if the number of small spheres or the density varies depending on the directions from which the sphere is seen. In an actual implementation, uniform distribution (for example, even distribution such that a single small sphere can be arranged in each of the cells in a sheet of section paper) may be easy to use and any density may be possible as long as not being extremely low. The object creating unit 505 may create, for example, a three-dimensional object formed by uniformly distributing, in a spherical space having a radius R of 10 cm, approximately 200 small spheres each having a radius of 1 cm.

The first symbol storage 510 may index and then store therein two-dimensional image information pieces on multiple known symbols to be the correct answers. As described above, the known symbol can be any symbol such as a character, a numeral and a sign including the plus sign, as long as the symbol is recognizable. Each piece of the image information on the known symbol to be stored in the first symbol storage 510 can also be described as an n×m matrix (where n and m are each a predetermined constant), and the data forming the matrix may be described by four elements (R, G, B and α) called texels. As described above, R, G and B respectively represents red color information, green color information and blue color information on texels, and α may indicate transparency of the image when the images are superimposed on one another.

The first symbol determining unit 515 may determine one or more known symbols, and first positions from which the known symbols can be seen, the first positions being on the surface of the three-dimensional object created by the object creating unit 505. The first symbol determining unit 515 may cause the random number generator 545 to generate random numbers and then randomly may choose one or more first symbols from the first symbol storage 510 on the basis of the random numbers thus generated. Moreover, the first symbol determining unit 515 may determine, the first positions, and the directions from which the first symbols can be seen.

Here, in a case where the number of known signals to be determined is one, the direction in which the known symbol is to be shown on the surface of the three-dimensional object can be any direction. However, in a case where the number of known symbols to be determined is more than one, after the direction in which one of the known symbols is to be shown is determined, the directions in which each of the rest of the known symbols is to be shown may be determined to be any direction except for the directions in which the symbol is to be shown while overlapping a different known symbol. The two-dimensional image information pieces on the one or more determined known symbols and the information pieces on the first positions of the respective known symbols (i.e. the directions from which the known symbols can be seen) may be passed to the color information determining unit 530 to be described later, and may be temporarily stored in a first buffer 535 of the color information determining unit 530.

The second symbol storage 520 may index and then may store therein two-dimensional image information pieces on multiple dummy symbols. As described above, the dummy symbol can be any symbol as long as it has no particular recognizable meaning, such as a diagonal line and a curved line. Moreover, the second symbol storage 520 may further index and then store therein at least one of: a two-dimensional background image to be drawn as the background on the surface of the above-described three-dimensional object; information on a method of creating the two-dimensional background image; and information on a method of deforming the one or more known symbols and the one or more dummy symbols.

Each of the image information pieces on the dummy symbols and the background image to be stored in the second symbol storage 520 can also be described as an n×m matrix (where n and m are each a predetermined constant), and the data forming the matrix may be described by four elements (R, G, B and α) called texels. As described above, R, G and B respectively represents red color information, green color information and blue color information on texels, and α may indicate transparency of the image when the images are superimposed on one another. The background image may be a background image conventionally used for causing computers to give wrong answers, for example, a background image including arcs, which are represented by lines small in width compared to the lines of known symbols and by curved lines as described above.

The information on the method of creating the background image and the information on the deformation method may respectively be information on the storage location of a program for creating the background image according to a particular algorithm and information on the storage location of a program for deforming the known symbols and the dummy symbols according to another particular algorithm. Such particular algorithms may be known algorithms used in a conventional two-dimensional CAPTCHA.

The second symbol determining unit 525 may determine one or more dummy symbols and second positions from which the dummy symbols can be seen, the second positions being on the surface of the three-dimensional object created by the object creating unit 505. The second symbol determining unit 525 may cause the random number generator 545 to generate random numbers and then may randomly choose one or more dummy symbols from the second symbol storage 520 on the basis of the random numbers thus generated. Moreover, the second symbol determining unit 525 may determine, the second positions, and the directions from which the second symbols can be seen. Here, the second symbol determining unit 525 may also randomly choose directions from which the dummy symbols can be seen using the random number generator 545. Alternatively, the second symbol determining unit 525 may also determine directions from which the dummy symbols can be seen so that the second symbols can always appear similarly on the surface of the three-dimensional object no matter from which direction the three-dimensional object is seen.

Note that, when determining the second positions for the dummy symbols (i.e. directions from which the dummy symbols can be seen), the second symbol determining unit 525 does not necessarily take into account the first positions for the known symbols (i.e. directions from which the known symbols can be seen), for the following reason. Even in a case where a known symbol overlaps a dummy symbol, it is possible to set it so as to show the known symbol over the dummy symbol, in other words, to set respective positions so as to show the known symbol in the foreground, by controlling the projection order of the images of the known and dummy symbols when projecting the images of the known and dummy symbols on the surface of the three-dimensional object in practice. Nevertheless, in order to secure good readability to humans, it may be preferable that the second position of each of the dummy symbols be determined so that the known symbols do not overlap any dummy symbols. The image information pieces on the one or more determined dummy symbols and the information pieces on the second positions of the respective dummy symbols (i.e. the directions from which the dummy symbols can be seen) may be passed to the color information determining unit 530 to be described later, and may be temporarily stored in a second buffer 540 of the color information determining unit 530.

The second symbol determining unit 525 may further choose a background image or an information piece on a creating method of a background from the second symbol storage 520. In a case of choosing an information piece on a creating method of a background image, the second symbol determining unit 525 may create a background image by means of the creating method. As described above, when the information on a creating method shows the storage location of a program for creating a background image, the second symbol determining unit 525 may start the program for creating a background image from the storage location, so that the program may create a background image. The created or chosen background image information piece may be passed to the color information determining unit 530 to be described later, and then may be temporarily stored in the second buffer 540 of the color information determining unit 530.

Moreover, the second symbol determining unit 525 may also choose an information piece on a deformation method from the second symbol storage 520. In a case of choosing an information piece on a deformation method, the second symbol determining unit 525 may deform the one or more known symbols and the one or more dummy symbols respectively stored in the first buffer 535 and the second buffer 540, on the basis of the deformation method, and then may update the symbols. As described above, when the information on a deformation method shows the storage location of a program for deforming the known symbols and the dummy symbols, the second symbol determining unit 525 may start the program for deforming the known symbols and the dummy symbols from the storage location so that the program may carry out deformation processing.

The color information determining unit 530 may determine the color information on the surface of the above-described three-dimensional object so that the one or more determined known symbols and the one or more determined dummy symbols can be seen respectively from the first and second positions on the surface of the three-dimensional object created by the object creating unit 505. The color information determination processing by the color information determining unit 530 may be performed by means of texture mapping, for example. Specifically, the color information determining unit 530 may read image information pieces on the known symbols from the first buffer 535 to use the image information pieces on the known symbols as textures. Furthermore, the color information determining unit 530 may read the information pieces on the first positions corresponding respectively to the above-described known symbols (i.e. the directions from which the known symbols can be seen) from the first buffer 535 to use the first positions as mapping directions. Thereafter, the color information determining unit 530 may apply the above-described image information piece on each of the known symbols to the surface of the above-described three-dimensional object from the corresponding determined mapping direction.

The application of the texture may be performed by accurately setting projection of the texture onto the object using UV coordinates, or may be performed simply by projecting the texture on the object from a viewpoint direction. In addition, the projection of the texture onto the object may be performed by means of a ray tracing technique. Alternatively, a technique may include changing the colors of pixels on the basis of a calculation made under the assumption that light is emitted on the object may also be used in order to simplify calculation processing by a computer. For example, in the second exemplary embodiment, the three-dimensional object may be a sphere formed of a set of multiple small spheres. Accordingly, in this case, the color information determining unit 530 may color small spheres so that each of the two-dimensional images of the known symbols can be projected onto the surface of the sphere formed from the set of multiple small spheres from a position which is away from the sphere at a predetermined distance and the corresponding first position of the known symbols, that is, the corresponding direction from which the known symbols can be seen.

If a character is projected onto a sphere directly, the character may be distorted on the spherical surface, and may thus be made difficult to read. Since such distortion of a character may affect recognition of a known symbol to be the correct answer by humans, it may be preferable to correct the distortion. Specifically, in the following method, a two-dimensional image of a character may be prepared in view of the fact that the character may be distorted if the character is projected directly onto a sphere (see FIG. 9A). Accordingly, the character in the two-dimensional image to be prepared may be originally distorted in the reverse direction from the direction in which the character is to be distorted, so that the character can be projected in the normal form as a result of being distorted (see FIG. 9B). Incidentally, in a case where the three-dimensional object is a sphere formed of a set of multiple small spheres, distortion correction may be performed for each of the small spheres.

The same method can be used for processing of image information on a dummy symbol and of image information on a background. However, in order that known symbols and dummy symbols are not hidden by the background, and that known symbols are not hidden by dummy symbols, texture mapping processing may be performed for image information on the background, image information on dummy symbols, and image information on known symbols, in this order. Thereafter, the color information determining unit 530 may store, in the three-dimensional data storage 550, the color information on the dots forming the surface of the three-dimensional object thus determined.

Figure 6:
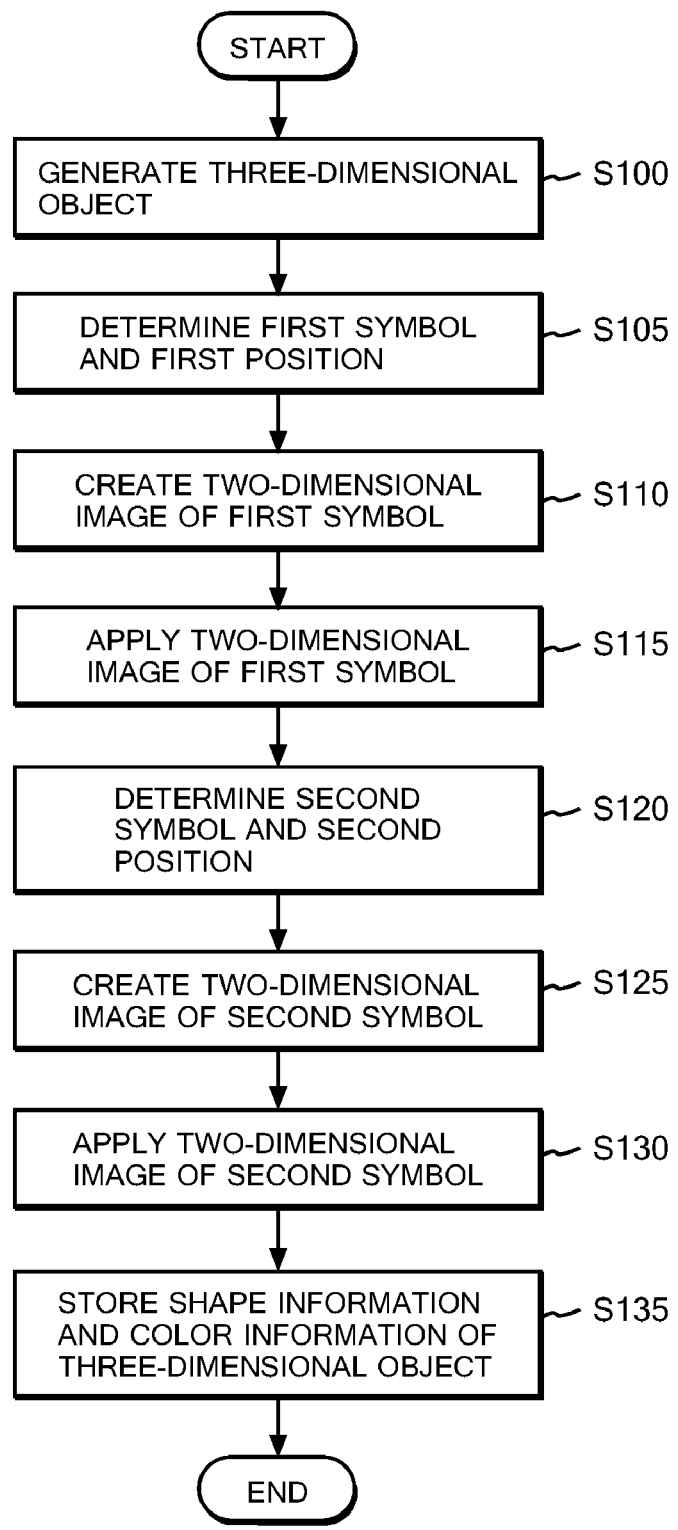
FIG. 6 is a flowchart showing an example of a flow of creating processing of a three-dimensional object according to the second exemplary embodiment of the present invention.
Figure 7:
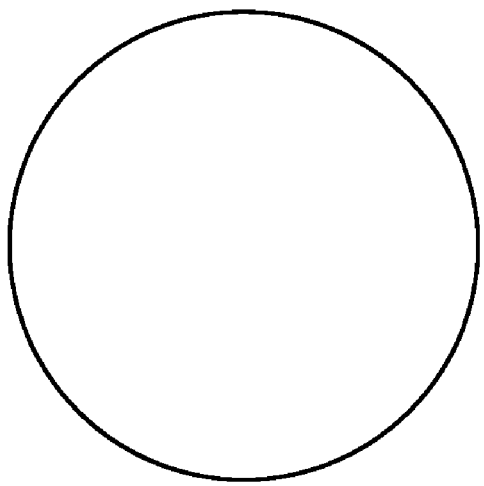
FIG. 7A is a view showing an example of a process for creating a three-dimensional object performed by the three-dimensional data creating device according to the second exemplary embodiment of the present invention.
FIG. 7B is a view showing another example of the process for creating a three-dimensional object performed by the three-dimensional data creating device according to the second exemplary embodiment of the present invention.
Figure 7:
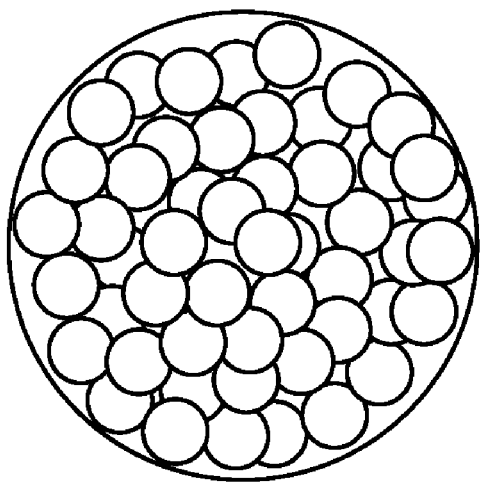
Figure 8:
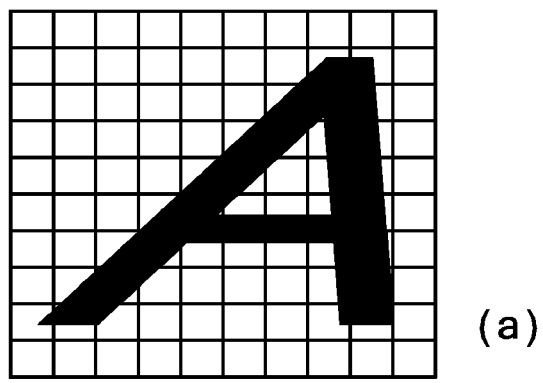
FIG. 8A is a view showing still another example of the process for creating a three-dimensional object performed by the three-dimensional data creating device according to the second exemplary embodiment of the present invention.
FIG. 8B is a view showing still another example of the process for creating a three-dimensional object performed by the three-dimensional data creating device according to the second exemplary embodiment of the present invention.
FIG. 8C is a view showing still another example of the process for creating a three-dimensional object performed by the three-dimensional data creating device according to the second exemplary embodiment of the present invention.
Figure 8:
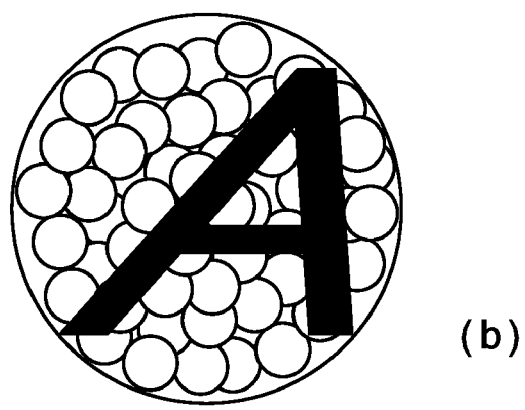
Figure 8:
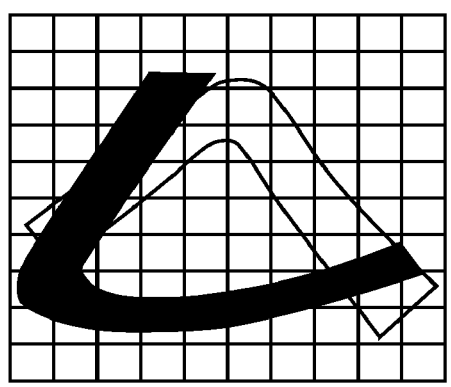
Figure 8:
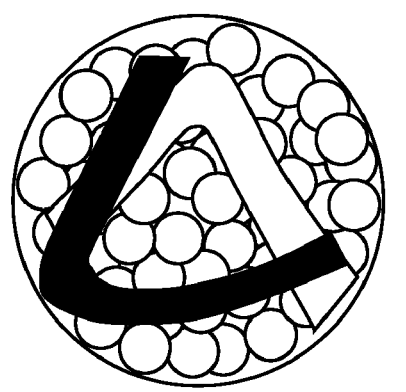
Figure 9:
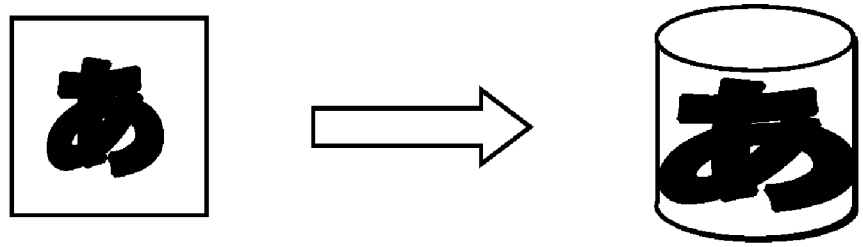
FIG. 9A is a view exemplifying a character distortion when projected on a cylinder.
FIG. 9B is a view showing an example of a conventional technique for correcting distortion.
Figure 9:
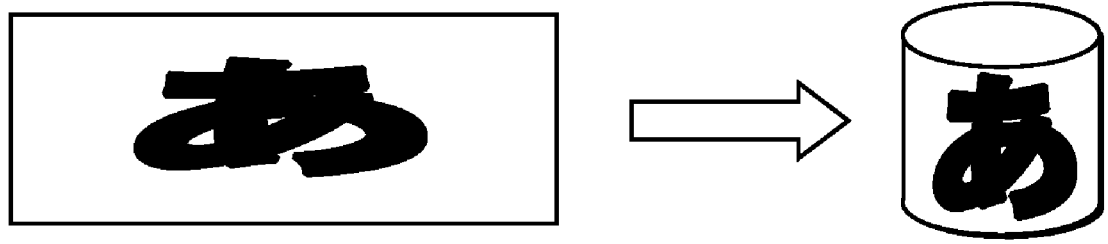

Next, a flow of processing to create three-dimensional image information on the three-dimensional object according to the present invention will be described with reference to FIG. 6, FIGS. 7A and 7B, and FIGS. 8A to 8D. FIG. 6 is a flowchart showing an example of a flow of processing to create three-dimensional image information performed in the three-dimensional data creating device 500. In FIG. 6, the process may start from Step S100 and the three-dimensional data creating device 500 may first create a three-dimensional object in a virtual three-dimensional space. In the second exemplary embodiment, a spherical space having a radius R may be defined in a virtual three-dimensional space, as shown in FIG. 7A. Then, a three-dimensional object having a shape of a sphere formed from a set of multiple small spheres may be created by randomly arranging multiple small spheres in the defined spherical space, as shown in FIG. 7B. Here, it is possible to obtain the effects of the present invention even when small spheres are arranged in the spherical space at regular intervals. However, random arrangement may be preferable since such an arrangement may make it more difficult for computers to perform analyses.

Next, the three-dimensional data creating device 500 for authentication may determine one or more known symbols and first positions from which the respective known symbols can be seen, the first positions being on the surface of the created three-dimensional object (Step S105). Here, when determining the known symbols, the three-dimensional data creating device 500 may determine not only the kinds (for example, letters A, D and the like) but also the colors of the known symbols. The known symbols may be in a single color or multiple colors. Moreover, when the three-dimensional data creating device 500 determines multiple known symbols, the colors of the known symbols may be determined independently from one another. Further, the first positions to be determined may be directions from which the first symbols can be seen in the three-dimensional space. Furthermore, the distance at which the three-dimensional object is to be seen, i.e., the distance between the three-dimensional object and a viewpoint, may be fixed or variable. In the second exemplary embodiment, the distance may be set to be predetermined, that is, fixed.

After determining the known symbols, the three-dimensional data creating device 500 may create a two-dimensional image of each determined known symbol (see FIG. 8A) (Step S110). Incidentally, the three-dimensional data creating device 500 may determine the first symbols by choosing the two-dimensional images of the first symbols from the first symbol storage 510 storing therein two-dimensional images of multiple kinds of known symbols. In this case, the process may jump from Step S105 to Step S115. Then, the three-dimensional data creating device 500 for authentication may apply the created two-dimensional image of the known symbol to the created three-dimensional object, from the direction which is away from the three-dimensional object at a predetermined distance and from which the determined known symbol can be seen (see FIG. 8B) (Step S115). Note that, Step S110 and Step S115 may be repeated for the number of times corresponding to the number of the determined known symbols.

When completing the processing for the known symbols to be the correct answers, the three-dimensional data creating device 500 may next determine one or more dummy symbols and second positions from which the respective dummy symbols can be seen, the second positions being on the surface of the created three-dimensional object (Step S120). Here, when determining the dummy symbols, the three-dimensional data creating device 500 may determine not only the kinds (for example, a curved line having a similar shape as that of alphabets A and the like) but also the colors of the dummy symbols. The dummy symbols may be in a single color or multiple colors. Moreover, the colors of the dummy symbols may be determined independently from one another. Further, the second positions to be determined may be directions from which the dummy symbols can be seen in the three-dimensional space. Furthermore, the distance at which the three-dimensional object is to be seen, i.e., the distance between the three-dimensional object and a viewpoint, may be the same distance as that determined for the known symbols, that is, the predetermined distance, in the second exemplary embodiment.

After determining the dummy symbols, the three-dimensional data creating device 500 may create a two-dimensional image of each determined dummy symbol (see FIG. 8C) (Step S125). Incidentally, the three-dimensional data creating device 500 may determine the dummy symbols by choosing the two-dimensional images of the dummy symbols from the second symbol storage 520 storing therein two-dimensional images of multiple kinds of dummy symbols. In this case, the process may jump from Step S120 to Step S130. Then, the three-dimensional data creating device 500 may apply the created two-dimensional image of the dummy symbol to the created three-dimensional object, from the direction which is away from the three-dimensional object at a predetermined distance and from which the determined dummy symbol can be seen (see FIG. 8D) (Step S130). Step S125 and Step S130 may be similarly repeated for the number of times corresponding to the number of the determined dummy symbols. Lastly, the three-dimensional data creating device 500 may store, in the three-dimensional data storage 550, shape information on the created three-dimensional object and color information on the surface of the three-dimensional object (Step S135), and then may terminate the process.

Next, described with reference to FIG. 2 again will be a case in which the one or more image information pieces stored in the image information storage 108 are the above-described three-dimensional image information pieces on the three-dimensional object created by the three-dimensional data creating device 500. In the second embodiment, in response to reception of a service use request, the reading unit 105 may read a single three-dimensional image information piece on the three-dimensional object from the image information storage 108, and then may pass the three-dimensional image information piece to the challenge data creating unit 110.

As described above, on the surface of the three-dimensional object created by the three-dimensional data creating device 500, a first symbol, which is known and is to be the correct answer, can be seen when seen from a certain direction, while a second symbol, which is a dummy, can be seen when seen from another direction. The user of the client 300 provided with such a three-dimensional object as challenge data may need to observe the three-dimensional object from multiple viewpoints, to find the first symbol to be the correct answer and to respond to the challenge.

Accordingly, the authentication server 100 may need to transmit the three-dimensional object created by the three-dimensional data creating device 500 in a form such that the user of the client 300 can observe the three-dimensional object from multiple viewpoints, the three-dimensional object having the one or more first symbols and the one or more second symbols shown on its surface. While there are some methods for enabling the above, three exemplary methods will be described in the following.

A first exemplary method is to create challenge data in the form of a GIF animation. In this case, the challenge data creating unit 110 may include the GIF animation creating unit 111. The GIF animation creating unit 111 may create, using the three-dimensional object information received from the reading unit 105, multiple two-dimensional images of the three-dimensional object seen from different viewpoints, and then may create an animation in the animation GIF format using the created multiple two-dimensional images.

For the selection of viewpoints for creating two-dimensional images, the first positions and the second positions corresponding respectively to the known symbols and the dummy symbols shown on the surface of the three-dimensional object can be used. In this case, the three-dimensional object information to be stored in the image information storage 108 may further include the first positions and the second positions corresponding respectively to the known symbols and the dummy symbols shown on the surface of the three-dimensional object.

The GIF animation creating unit 111 may create, for each of the known symbols which can be seen on the surface of the three-dimensional object, a two-dimensional image having the direction from which the known symbol can be seen as the viewpoint. However, it is not always necessary to create, for each of the dummy symbols, a two-dimensional image having the direction from which the dummy symbol can be seen as the viewpoint. In other words, the GIF animation creating unit 111 may adjust the number of two-dimensional images to create, according to the difficulty level of challenge data to create or on the basis of the constraint on the size of the animation in the animation GIF format to create. Moreover, the created two-dimensional images may be arranged (displayed) in random order or in an order such that the three-dimensional object can appear as if rotating upward, downward, rightward or leftward.

In the case of creating challenge data in the form of a GIF animation, the direction from which the three-dimensional object is to be observed may be determined by the authentication server 100, and cannot be determined freely by the user of the client 300. Nevertheless, an animation in the animation GIF format may be preferable in that such animations can be viewed by many current browsers, and hence, any additional program may be required for displaying challenge data. Alternatively, an animation in the MPEG (Moving Picture Experts Group) format in which the three-dimensional object rotates may also be created instead of an animation in the animation GIF format.

A second exemplary method is to create challenge data as a clickable map. In this case, the challenge data creating unit 110 may include a clickable map creating unit 112. A clickable map is an image having a clickable map function. The clickable map function is the function in which various links are set in an image in advance so as to jump to the link corresponding to a clicked position. The clickable map creating unit 112 may create a two-dimensional image of the three-dimensional object seen from a predetermined viewpoint using the three-dimensional object information received from the reading unit 105, and then may create, as challenge data, a clickable map including links set respectively for multiple regions of the two-dimensional image, the links each being a link to the two-dimensional image of the three-dimensional object seen from the corresponding region.

Figure 10:
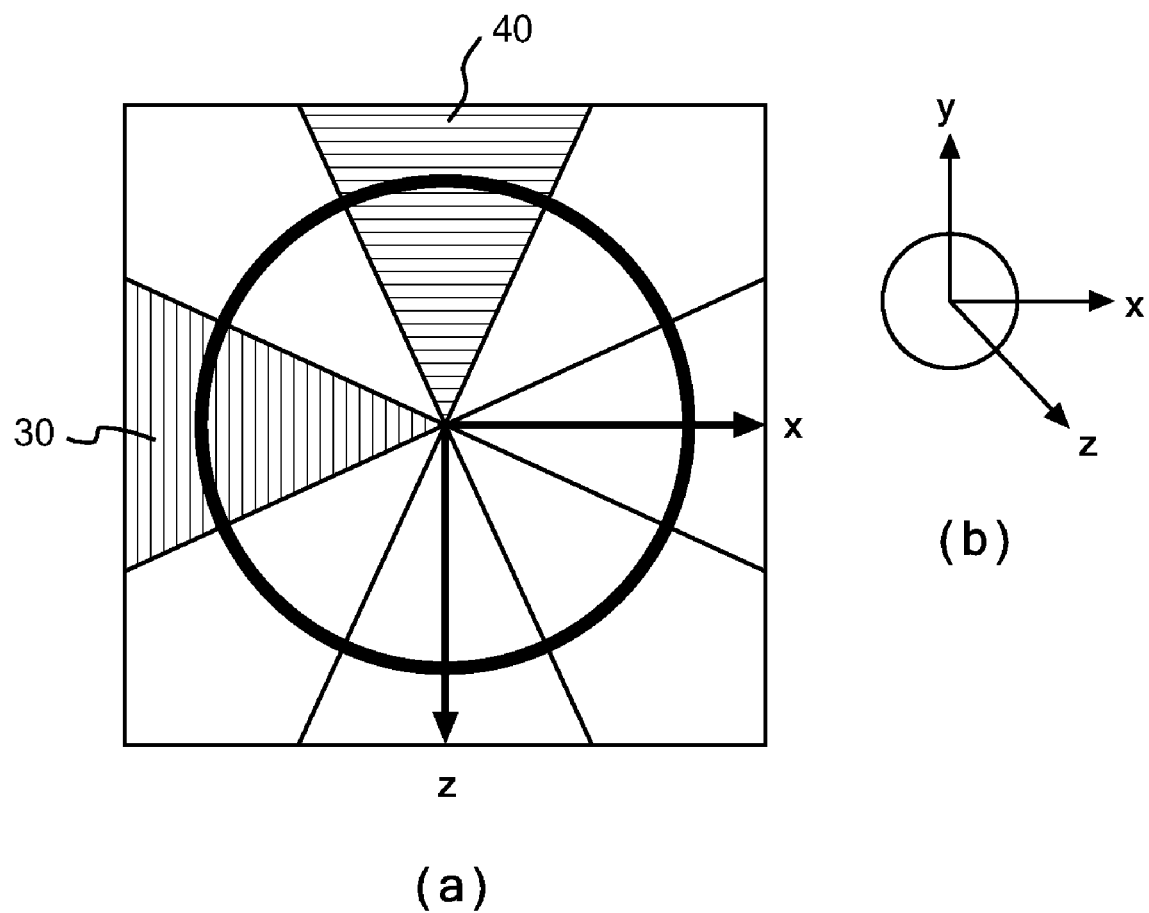
FIG. 10A is a view showing an example of challenge data created by an authentication server according to the second exemplary embodiment of the present invention.
FIG. 10B is a view showing an example of the three-dimensional object created by the three-dimensional data creating device according to the second exemplary embodiment of the present invention.

A creation method of a clickable map performed by the clickable map creating unit 112 will be described in detail with reference to FIGS. 10A and 10B. First, the clickable map creating unit 112 may create a two-dimensional image of the three-dimensional object seen from a predetermined viewpoint, and uses this image as the basic two-dimensional image. An example of the basic two-dimensional image is shown in FIG. 10A. This two-dimensional image shows a sphere of the three-dimensional object in FIG. 10B seen from the positive direction of the y-axis. A two-dimensional image of the sphere seen from another direction may also be used as the basic two-dimensional image, instead. For simplification of explanation, the known symbols and dummy symbols on the surface of the three-dimensional object are omitted in FIGS. 10A and 10B.

After creating the basic two-dimensional image, the clickable map creating unit 112 may divide the two-dimensional image into multiple regions. The two-dimensional image may be divided into any forms, but may be preferably divided in a radial pattern as shown in FIG. 10A. Then, the clickable map creating unit 112 may create two-dimensional images of the three-dimensional object seen respectively from the resultant regions, and may then store the images respectively in predetermined locations. Lastly, the clickable map creating unit 112 may set, in each of the resultant regions, the link to the two-dimensional image of the three-dimensional object seen from the corresponding region.

In the browser of the client 300 having received such a clickable map, when the user clicks a region 30 shown in FIG. 10A, for example, it may mean that the browser requests, to the authentication server 100, a two-dimensional image of the three-dimensional object seen from the negative direction of the x-axis. Meanwhile, when the user clicks a region 40 shown in FIG. 10A, it may mean that the browser requests, to the authentication server 100, a two-dimensional image of the three-dimensional object seen from the negative direction of the z-axis.

In the case of creating challenge data as a clickable map, the user of the client 300 can specify the direction from which the user is to observe the three-dimensional object, which is the challenge data. Note that, although the number of directions which can be specified is limited to the number of regions into which the basic two-dimensional image is divided, it may be possible to increase the number of directions which can be specified by dividing the image into smaller regions. Moreover, a clickable map is one of browser-based functions, and hence, no additional program may be required for displaying challenge data in the client 300.

A third exemplary method may be to create a program, that is, a viewer, which makes it possible to see the three-dimensional object from any directions by rotating the three-dimensional object using an input device such as a mouse and to include the viewer in the challenge data. In this case, the challenge data creating unit 110 may include a three-dimensional challenge data creating unit 113 and a viewer storage 114 storing viewers. Methods of creating a viewer for a three-dimensional object may utilize programs such as a Java® applet, Java® script and Flash, for example. When receiving three-dimensional object information from the reading unit 105, the three-dimensional challenge data creating unit 113 may create challenge data including the three-dimensional object information and the program, which makes it possible to see the three-dimensional object from any directions.

The viewer to be read out from the viewer storage 114 to be used as part of the challenge data is to read data of a three-dimensional object on which data rendering processing is to be performed, at the time when the viewer is started. With this configuration, a single viewer can be used for all three-dimensional objects. For this reason, the three-dimensional challenge data creating unit 113 may convert the three-dimensional object information piece received from the reading unit 105 into a file having an appropriate name.

In the case of including in the challenge data, the program which makes it possible to rotate the three-dimensional object using an input device such as a mouse, the user of the client 300 can freely rotate the three-dimensional object, which is the three-dimensional data for authentication, by means of an operation such as dragging. Thereby, the user of the client 300 can observe the three-dimensional object from any directions. It may be preferable to create the program using Java® applet, JavaScript® or Flash, because such programs can run in a browser. Incidentally, such three-dimensional challenge data can also be used for a service that provides a three-dimensional virtual reality world, which service is recently drawing attention. In this case, special client software for accessing the virtual reality world may be installed in the computer of the service user in advance. Accordingly, it is not necessary to include a viewer in the three-dimensional challenge data, unlike the case of the second embodiment.

Next, detailed description will be given of how challenge data created respectively by means of the above-described methods would look on the display screen of the client 300, with reference to FIGS. 11A and 11B, FIG. 12 and FIG. 13. All of the challenge data shown in FIG. 11A, FIG. 12 and FIG. 13 may be created on the basis of three-dimensional image information on a three-dimensional spherical object on the surface of which a letter "A" to be the correct answer and arcs such as a straight line and a curved line can be seen.

Figure 11:
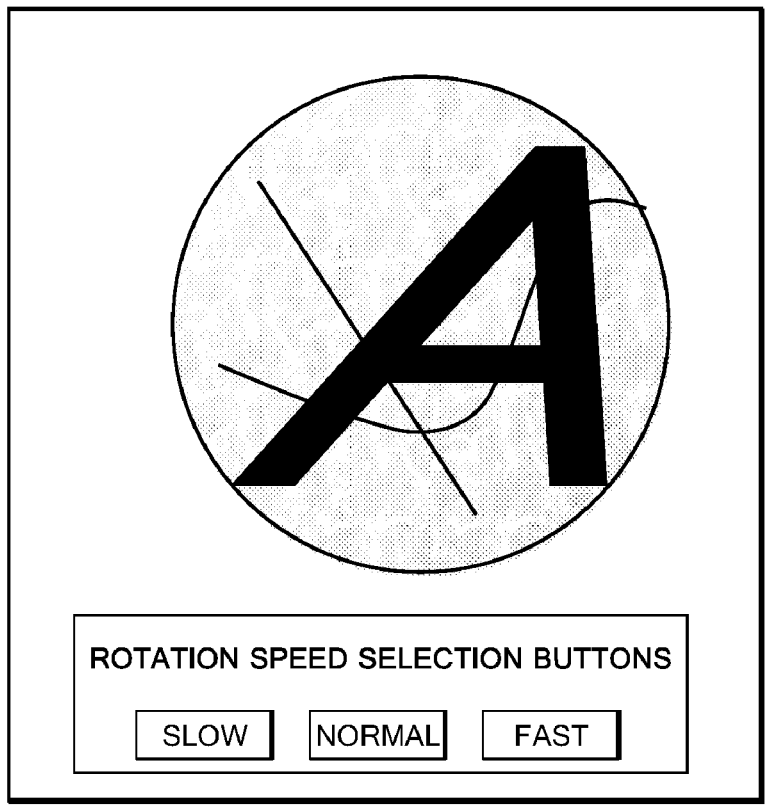
FIGS. 11A and 11B are views showing an example of a display screen of a client displaying a GIF animation according to the second exemplary embodiment of the present invention.
Figure 11:
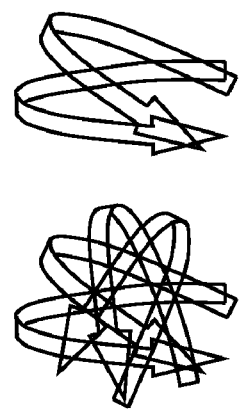

FIG. 11A shows an example of a GIF animation which may be created by the GIF animation creating unit 111, and which may be displayed on the display screen of the client 300. In this GIF animation, a three-dimensional spherical object is shown so that the three-dimensional spherical object can rotate while little by little changing the rotation axis passing through the center of the three-dimensional spherical object. Accordingly, this may make it possible for the user of the client 300 to see all the known symbols to be the correct answers shown on the surface of the three-dimensional spherical object. The interval between the time of displaying a two-dimensional image and the time of displaying the next two-dimensional image, that is, the rotation speed of the sphere may be fixed or may be variable. In the latter case, selection buttons may also be displayed so that the user can select rotation speed, as shown in FIG. 11A. It should be noted that resistance to attacks by computers may not be dependent on rotation speed.

Figure 12:
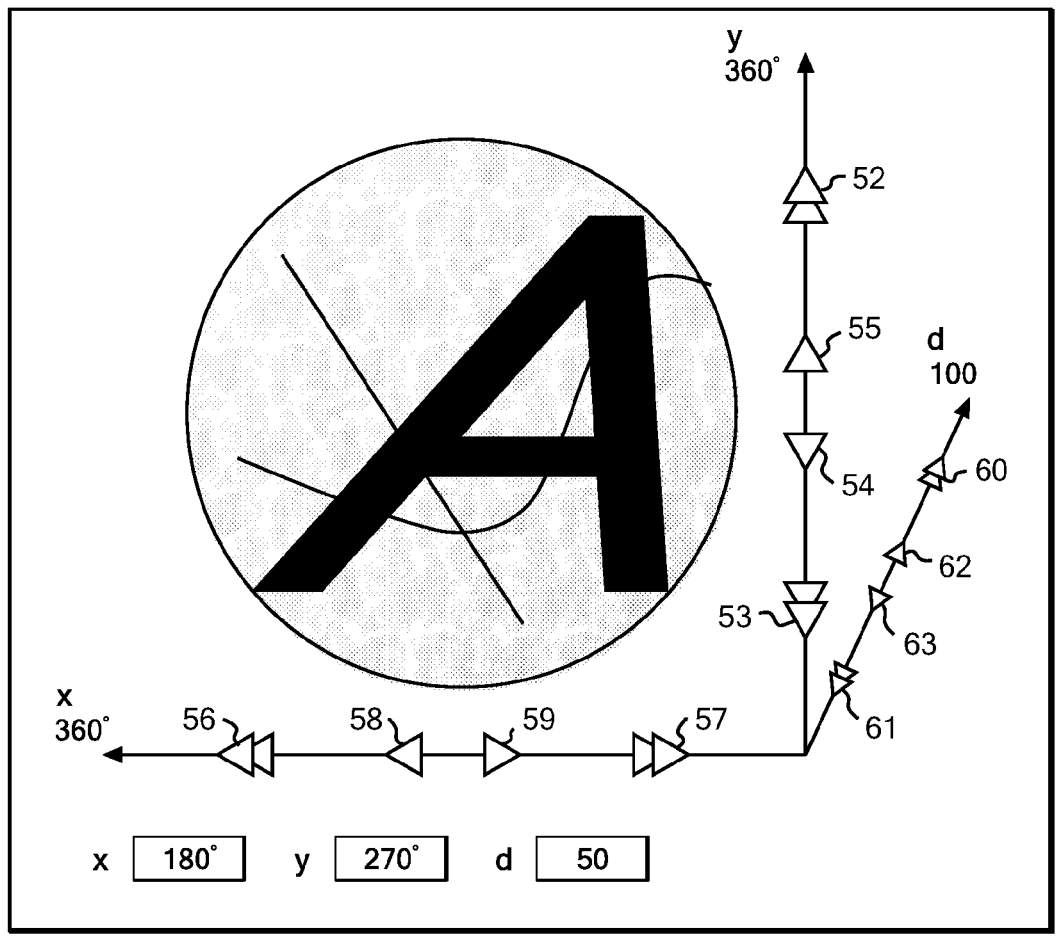
FIG. 12 is a view showing an example of a display screen of the client displaying a clickable map according to the second exemplary embodiment of the present invention.

FIG. 12 shows an example of a clickable map which is created by the clickable map creating unit 112, and which is displayed on the display screen of the client 300. When clicking either a double triangle button 52 (for rotation by a large angle) or a single triangle button 55 (for rotation by a small angle) on the y-axis, the user of the client 300 can see a two-dimensional image of the three-dimensional spherical object shown in FIG. 12 rotated upward in the vertical direction. On the other hand, when clicking either a double triangle button 53 (for rotation by a large angle) or a single triangle button 54 (for rotation by a small angle) on the y-axis, the user of the client 300 can see a two-dimensional image of the three-dimensional spherical object rotated downward in the vertical direction.

Similarly, when clicking one of buttons 56 to 59 on the x-axis, the user of the client 300 can see a two-dimensional image of the three-dimensional spherical object rotated in the horizontal direction. Moreover, when clicking either a double triangle button 60 (for moving further away) or a single triangle button 62 (for moving slightly further away) on the d-axis, the user of the client 300 can see a two-dimensional image of the three-dimensional spherical object seen from the viewpoint moved further away from the sphere. Likewise, when clicking either a double triangle button 61 (for moving closer) or a single triangle button 63 (for moving slightly closer) on the d-axis, the user of the client 300 can see a two-dimensional image of the three-dimensional spherical object seen from the viewpoint moved closer to the sphere. Incidentally, the specified rotation angles, the distance between the viewpoint and the sphere may be displayed under the two-dimensional image, as shown in FIG. 12.

Figure 13:
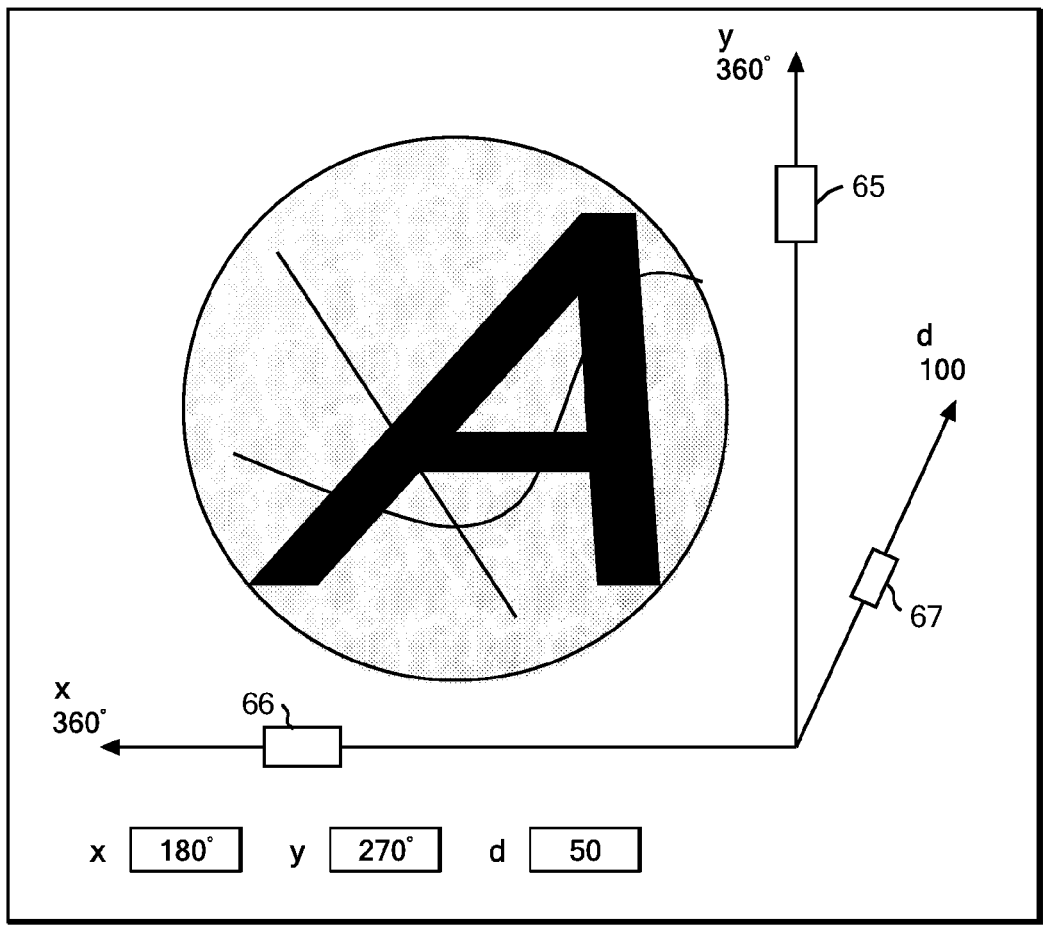
FIG. 13 is a view showing an example of a display screen of the client in which a viewer according to the second exemplary embodiment of the present invention may be started.

FIG. 13 shows an example of a three-dimensional object in which a viewer, contained in challenge data that is created by the three-dimensional challenge data creating unit 113, may be started and displayed on the display screen of the client 300. In the example shown in FIG. 13, the viewer may display three scroll bars as the x-axis, the y-axis and the d-axis on the display screen of the client 300. For example, the user of the client 300 can rotate the three-dimensional spherical object shown in FIG. 13 in either the vertical direction or the horizontal direction on the display screen by moving a knob 65 up and down or a knob 66 to the right and left. Similarly, the user of the client 300 can move the viewpoint away from or closer to the sphere by moving a knob 67 along the d-axis.

In any of the three examples described above, the user of the client 300 may be provided with one or more two-dimensional images each containing one or more known symbols and one or more two-dimensional images each containing one or more dummy symbols, one image at a time. However, display time for each of the two-dimensional images can be adjusted by the user in the example using a clickable map and the example using a special viewer. In other words, the user can shorten display time for each of the two-dimensional images not including any known symbol to be the correct answer, and thereby, can ignore irrelevant two-dimensional images more easily. Accordingly, it is easy to maintain a certain level of readability while quantitatively increasing attack resistance in the case of using a clickable map or a special viewer, compared to the case of using a GIF animation.

Moreover, in the example of using a special viewer, the viewpoint from which the three-dimensional object is to be seen can be changed continuously. Hence, in this example, it may be possible to sharply increase the number of two-dimensional images to be analyzed, compared to the other examples. Nevertheless, humans have a perception characteristic to perceive or find known symbols more easily than unknown symbols having no particular meaning. Accordingly, the user of the client 300 can easily find the viewpoint from which known symbols to be the correct answers can be seen. By contrast, computers do not have such a perception characteristic, and consequently need to analyze two-dimensional images seen from all the viewpoints from which the dummy symbols can be seen. Hence, it is easy to maintain a certain level of readability while quantitatively increasing attack resistance in the case of using a special viewer, compared to the other two examples.

Figure 14:
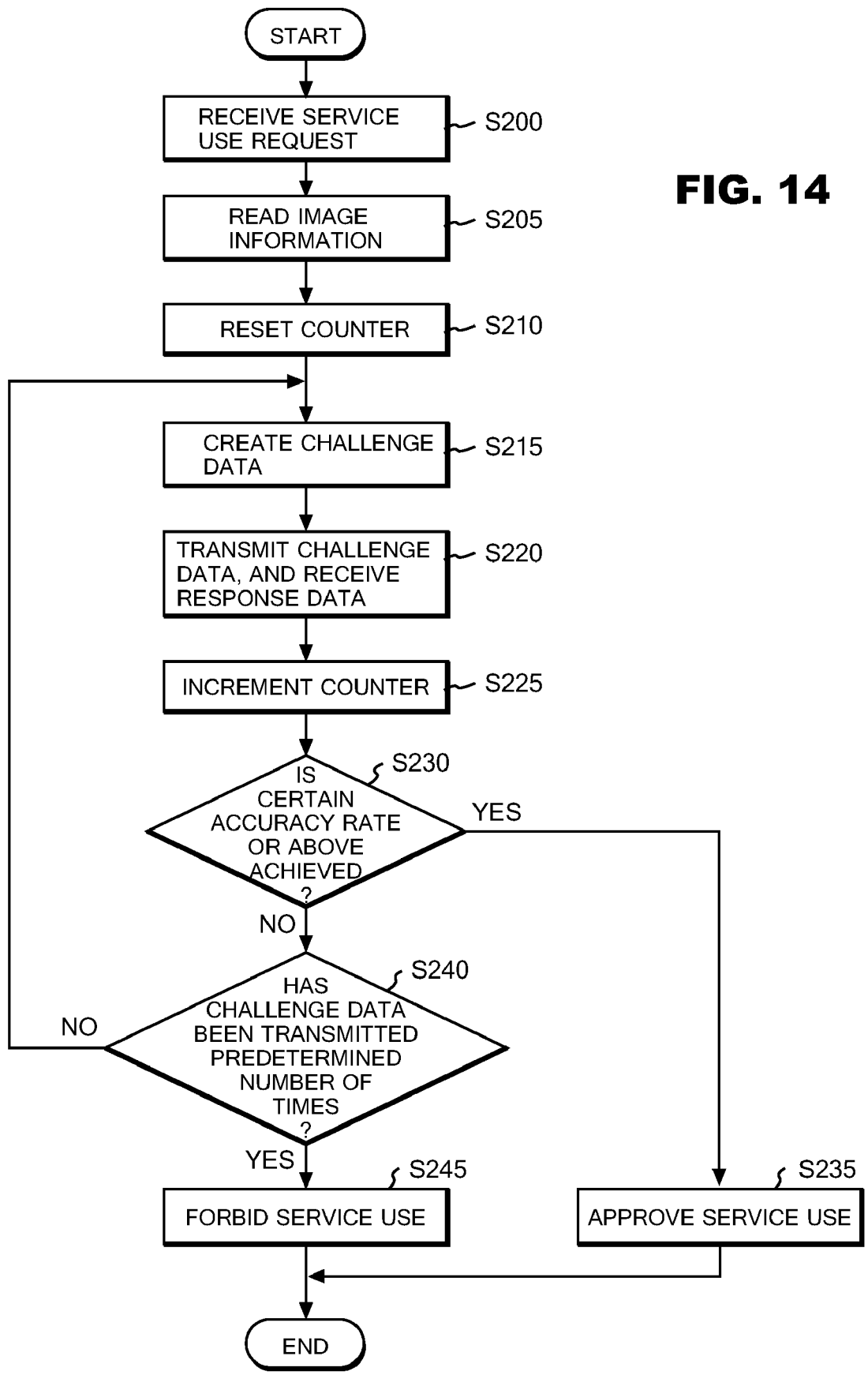
FIG. 14 is a flowchart showing an example of a flow of authentication service processing according to the second exemplary embodiment of the present invention, the processing being performed by an authentication server.

Next, a flow of authentication service processing of the present invention will be described with reference to FIG. 14. FIG. 14 is a flowchart showing an example of a flow of authentication service processing carried out in the authentication server 100. In FIG. 14, the process may start in Step S200. Upon receipt of a service use request for a service provided by the server 400 from the client 300 (Step S200), the authentication server 100 may randomly read one or more image information pieces from the image information storage 108 (Step S205).

Next, the authentication server 100 may reset a counter for counting the number of challenge times of the client 300 (Step S210), and then may create challenge data for testing whether or not the user of the client 300 is human, on the basis of the one or more read image information pieces (Step S215).

Here, when a single alphabet character is contained as the correct symbol, in the one or more read image information pieces, the authentication server 100 may create, as part of the challenge data, a question to be presented to the user. For example, "One alphabet character is included in the images to be displayed. Find and input the character." Similarly, when two alphabet characters and a single numeral are contained as the correct symbols, in the one or more read image information pieces, the authentication server 100 may create, as part of the challenge data, a question to be presented to the user. For example, "Three characters of either an alphabet or a numeral are included in the three-dimensional image to be displayed. Find and input all the characters."

Then, the authentication server 100 may transmit the created challenge data to the client 300, and may receive response data to the challenge data from the client 300 (Step S220). Upon receipt of the response data, the authentication server 100 may increment the counter by one (Step S225).

The authentication server 100 may read from the image information storage 108, one or more known symbols corresponding respectively to the one or more image information pieces read in Step S205, and then compares the one or more read known symbols with the received response data to judge whether or not a certain accuracy rate or above is achieved (Step S230). If the certain accuracy rate or above is achieved (Step S230: YES), the authentication server 100 may approve the service use and then may transmit approval information to the client 300 (Step S235). Thereafter, the process may be terminated.

On the other hand, if the certain accuracy or above is not achieved (Step S230: NO), the authentication server 100 may check the counter to judge whether or not challenge data has been transmitted to the client 300 a predetermined number of times (Step S240). If challenge data has not been transmitted the predetermined number of times (Step S240: NO), the process may return to Step S215, and the authentication server 100 may create challenge data again.

If challenge data has been transmitted the predetermined number of times (Step S240: YES), the authentication server 100 may reject the service use, and may forbid the client 300 access to the authentication server 100 for a certain period of time (Step S245). Then, the process may be terminated.

Figure 15:
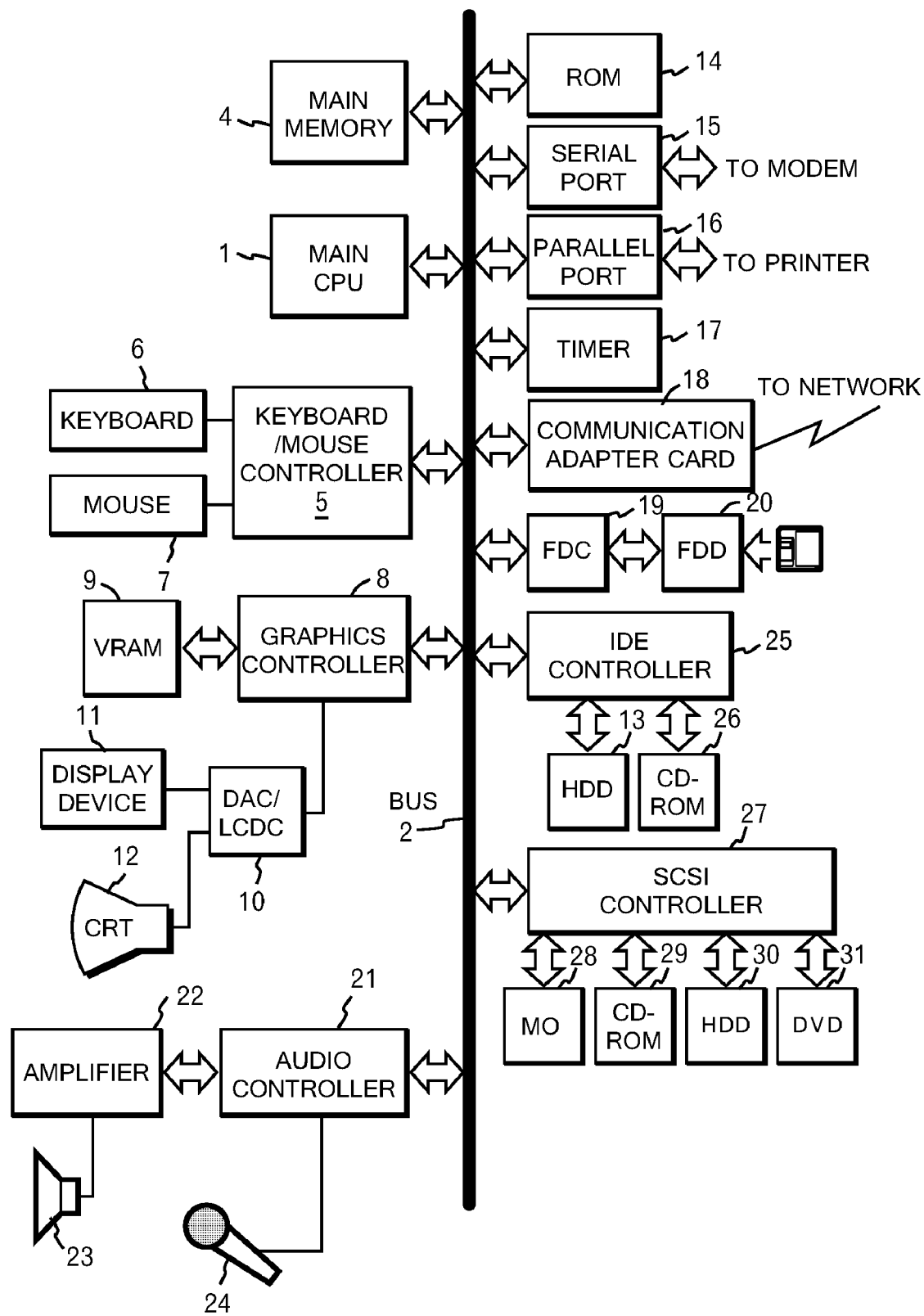
FIG. 15 is a diagram showing an example of a hardware configuration of an information processing device suitable for implementing an authentication server and a three-dimensional data creating device according to the embodiments of the present invention.

FIG. 15 is a diagram showing an example of a hardware configuration of an information processing device suitable for implementing the authentication server 100 and the three-dimensional data creating device 500 according to the embodiments of the present invention. The information processing device may include a CPU (central processing unit) 1 and a main memory 4 connected to a bus 2. Removable storages (external storage systems each using an exchangeable recording medium) such as hard disk drives 13 and 30, CD-ROM drives 26 and 29, a flexible disk drive 20, an MO drive 28 and a DVD drive 31 may be connected to the bus 2 through a floppy (registered trademark) disk controller 19, an IDE controller 25, a SCSI controller 27 and the like.

A storage medium such as a flexible disk, an MO, a CD-ROM or a DVD-ROM is inserted into the corresponding removable storage. It is possible to store, in these storage media, the hard disk drives 13 and 30 as well as a ROM 14, the code of a computer program for implementing the present invention by giving a command to the CPU and the like, in cooperation with an operating system.

Specifically, a program for creating three-dimensional data and three-dimensional image information on a three-dimensional object created by executing the program can be stored in the above-described storage devices of the information processing device as the three-dimensional data creating device 500. Meanwhile, a program for providing authentication services can be stored in a storage device of the information processing device as the authentication server 100. These multiple computer programs are loaded into the main memory 4 to be executed. It is also possible to compress the computer program, or divide the computer program into some pieces so that the resultant computer programs may be recorded in multiple media.

The information processing device receives inputs from input devices such as a keyboard 6 and a mouse 7 through a keyboard/mouse controller 5. Moreover, the information processing device receives an input from a microphone 24 through an audio controller 21, and then outputs sound from a speaker 23. The information processing device is connected to a display device 11 for providing visual data to the user, through a graphics controller 10. Furthermore, the information processing device is connected to a network through a network adaptor 18 (such as an Ethernet® card or a token ring card) or the like, and can thereby communicate with other computers and the like.

From the above description, it may be easily understood that the information processing device suitable for implementing the authentication server 100 and the three-dimensional data creating device 500 according to the embodiments of the present invention can be achieved by an information processing device such as a standard personal computer, a work station or a main frame, or a combination of these. However, it is preferable that the information processing device as the three-dimensional data creating deice 500 include the graphics controller 10 having a performance level that exceeds a predetermined value and a large capacity video memory 9, since the information processing device needs to perform three-dimensional graphics processing. It should be noted that the above-described constituent elements are given as examples, and that not all the constituent elements are essential for the present invention.

Hereinabove, the present invention has been described on the basis of the embodiments. However, the technical scope of the present invention is not limited to the scope of the above-described embodiments. It is obvious to those skilled in the art that various modifications or improvements can be made to the above-described embodiments. Hence, such modified or improved embodiments are naturally included in the technical scope of the present invention.

Although the preferred embodiments of the present invention have been described in detail, it should be understood that various changes, substitutions and alternations can be made therein without departing from spirit and scope of the inventions as defined by the appended claims.

What is claimed is:

1. An authentication server device comprising:
   an image information storage which stores therein a plurality of image information pieces each containing at least one of one or more known symbols and one or more dummy symbols;
   a receiver that receives a service use request from a client device via a network;
   a reading unit that reads one or more of the image information pieces from the image information storage in response to receipt of the service use request;
   a challenge data creation unit that creates challenge data by using the one or more read image information pieces so that one or more two-dimensional images each containing one or more of the known symbols and one or more two-dimensional images each containing one or more of the dummy symbols presented in turn to the user of the client device, one image at a time;
   a testing unit that transmits the created challenge data to the client device, and which receives corresponding response data from the client device; and
   an approving unit that judges whether or not the received response data matches the one or more known symbols contained in the transmitted challenge data, and which approves the service use of the client device when the match is confirmed,
   wherein the image information storage stores therein a plurality of three-dimensional image information pieces on a three-dimensional object on a surface of which one or more of the known symbols and one or more of the dummy symbols are shown,
   wherein the reading unit reads one of the three-dimensional image information pieces on the three-dimensional object from the image information storage upon reception of the service use request, and
   wherein the challenge data creation unit creates a plurality of two-dimensional images of the three-dimensional object seen from different viewpoints, on the basis of the read three-dimensional image information piece, and then creates, as the challenge data, an animation in the animation GIF format, by using the plurality of two-dimensional images.

2. The authentication server device according to claim 1, wherein the dummy symbols are symbols which are similar to the known symbols in at least one of shape and line width, and which have no particular meaning.

3. The authentication server device according to claim 1, wherein the plurality of two-dimensional images each contain an arc at least in a background or a foreground of the two-dimensional images.

4. The authentication server device according to claim 1, wherein the image information storage stores therein a plurality of two-dimensional images each containing one or more known symbols and a plurality of two-dimensional images each containing one or more dummy symbols.

5. The authentication server device according to claim 4, wherein:
   the reading unit reads one or more of the two-dimensional images each containing one or more known symbols and one or more of the two-dimensional images each containing one or more dummy symbols, upon receipt of the service use request, and
   the challenge data creation unit creates, as the challenge data, an animation in the animation GIF format, by using the read plurality of two-dimensional images.

6. The authentication server device according to claim 1, wherein:
   the challenge data creation unit creates a two-dimensional image of the three-dimensional object seen from a predetermined viewpoint, on the basis of the read three-dimensional image information piece, and then creates, as the challenge data, a clickable map in which links are set respectively for a plurality of regions of the two-dimensional image, the links each being a link to a two-dimensional image of the three-dimensional object seen from the corresponding region.

7. The authentication server device according to claim 1, wherein:
   the reading unit reads one of the three-dimensional image information pieces on the three-dimensional object from the image information storage upon receipt of the service use request; and
   the challenge data creation unit creates the challenge data containing the three-dimensional image information piece and a program which is to be executed in the client device to enable the user to see the three-dimensional object from any directions.

8. The authentication server device according to claim 1, wherein the three-dimensional image information pieces each contain shape information on the three-dimensional object and color information on the surface of the three-dimensional object.

9. The authentication server device according to claim 8, wherein the three-dimensional object is a sphere formed of a plurality of small spheres.

10. The authentication server device according to claim 9, wherein the color information on the surface of the three-dimensional object is determined so that the known symbols are shown on surfaces of the plurality of small spheres without being distorted.

11. The authentication server device according to claim 1, wherein the approving unit judges whether or not the received response data matches one or more of the known symbols contained in the transmitted challenge data, and approves the service use of the client device if a certain accuracy rate or above is achieved.

12. The authentication server device according to claim 1, wherein
   the challenge data creation unit creates a plurality of challenge data,
   the testing unit performs a test a plurality of times for the single client device by using the plurality of challenge data,
   the approving unit judges, for each of the challenge data, whether or not the received response data matches one or more of the known symbols contained in the transmitted challenge data, and approves the service use of the client device if the match is confirmed a predetermined number of times or more.

13. An authentication method performed by an authentication server including an image information storage storing therein a plurality of image information pieces each containing at least one of one or more known symbols and one or more dummy symbols, the authentication method comprising:
   receiving a service use request from a client device via a network;
   reading one or more of the image information pieces from the image information storage in response to receipt of the service use request;
   creating challenge data by using the one or more read image information pieces so that one or more two-dimensional images each including one or more of the known symbols and one or more two-dimensional images each including one or more of the dummy symbols are presented in turn to the user of the client device, one image at a time;
   transmitting the created challenge data to the client device, and receiving corresponding response data from the client device; and
   judging whether or not the received response data matches one or more of the known symbols contained in the transmitted challenge data, and approving the service use of the client device if the match is confirmed,
   wherein the image information storage stores therein a plurality of three-dimensional image information pieces on a three-dimensional object on a surface of which one or more of the known symbols and one or more of the dummy symbols are shown,
   wherein reading the one or more of the image information pieces includes reading one of the three-dimensional image information pieces on the three-dimensional object from the image information storage upon receipt of the service use request, and
   wherein creating the challenge data includes creating a plurality of two-dimensional images of the three-dimensional object seen from different viewpoints, on the basis of the read three-dimensional image information piece; and then creating, as the challenge data, an animation in the animation GIF format, the animation using the plurality of two-dimensional images.

14. The authentication method according to claim 13, wherein:
   creating the challenge data includes creating a two-dimensional image of the three-dimensional object seen from a predetermined viewpoint, on the basis of the read three-dimensional image information piece; and then creating, as the challenge data, a clickable map in which links are set respectively for a plurality of regions of the two-dimensional image, the links each being a link to a two-dimensional image of the three-dimensional object seen from the corresponding region.

15. The authentication method according to claim 13, wherein:
   creating the challenge data includes creating the challenge data containing the three-dimensional image information piece and a program which enables the three-dimensional object to be seen from any directions, and which is to be executed in the client device.

16. An authentication program stored on a non-transitory storage medium and read and executed by a processor of an authentication server including an image information storage storing therein a plurality of image information pieces each containing one or more known symbols, one or more dummy symbols, or both one or more known symbols and one or more dummy symbols, the authentication program causing the authentication server to:
   receive a service use request from a client device via a network;
   read one or more of the image information pieces from the image information storage in response to receipt of the service use request;
   create challenge data using the one or more read image information pieces so that one or more two-dimensional images each including one or more of the known symbols and one or more-two-dimensional images each including one or more of the dummy symbols are presented in turn to the user of the client device, one image at a time, the challenge data being for testing whether or not the user of the client device is human;
   transmit the created challenge data to the client device, and receiving corresponding response data from the client device; and
   judge whether or not the received response data matches one or more of the known symbols contained in the transmitted challenge data, and approving the service use of the client device when the match is confirmed,
   wherein the image information storage stores therein a plurality of three-dimensional image information pieces on a three-dimensional object on a surface of which one or more of the known symbols and one or more of the dummy symbols are shown, wherein reading the one or more of the image information pieces includes reading one of the three-dimensional image information pieces on the three-dimensional object from the image information storage upon receipt of the service use request, and wherein creating the challenge data includes creating a plurality of two-dimensional images of the three-dimensional object seen from different viewpoints, on the basis of the read three-dimensional image information piece; and then creating, as the challenge data, an animation using the plurality of two-dimensional images.

* * * * *